United States Patent
Akashika

(10) Patent No.: US 10,546,286 B2
(45) Date of Patent: Jan. 28, 2020

(54) INFORMATION PROCESSING SERVER, INFORMATION PROCESSING METHOD, INFORMATION PROCESSING PROGRAM PRODUCT, RECORDING MEDIUM ON WHICH INFORMATION PROCESSING PROGRAM PRODUCT IS RECORDED, PORTABLE TERMINAL, INFORMATION PROCESSING METHOD EXECUTED BY HANDHELD COMPUTER, PROGRAM PRODUCT FOR PORTABLE TERMINAL, AND RECORDING MEDIUM ON WHICH PROGRAM PRODUCT FOR PORTABLE TERMINAL IS RECORDED

(71) Applicant: Rakuten, Inc., Shinagawa-ku, Tokyo (JP)

(72) Inventor: Hideki Akashika, Shinagawa-ku (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 371 days.

(21) Appl. No.: 14/369,499

(22) PCT Filed: Dec. 27, 2012

(86) PCT No.: PCT/JP2012/083884
§ 371 (c)(1),
(2) Date: Jun. 27, 2014

(87) PCT Pub. No.: WO2013/100055
PCT Pub. Date: Jul. 4, 2013

(65) Prior Publication Data
US 2014/0379566 A1    Dec. 25, 2014

(30) Foreign Application Priority Data

Dec. 28, 2011 (JP) .................. 2011-290191

(51) Int. Cl.
*G06Q 20/22* (2012.01)
*G06Q 20/32* (2012.01)
(Continued)

(52) U.S. Cl.
CPC ......... *G06Q 20/22* (2013.01); *G06Q 20/0655* (2013.01); *G06Q 20/20* (2013.01); *G06Q 20/32* (2013.01); *G06Q 20/352* (2013.01)

(58) Field of Classification Search
CPC .................................................. G06Q 20/22
(Continued)

(56) References Cited

U.S. PATENT DOCUMENTS

2004/0172359 A1* 9/2004 Nakamura ............. G06Q 20/02
705/39
2005/0131577 A1 6/2005 Ota et al.
(Continued)

FOREIGN PATENT DOCUMENTS

EP    1 030 272 A2    8/2000
EP    1 596 342 A1    11/2005
(Continued)

OTHER PUBLICATIONS

"New electronic funds transfer services over IP," by R.J.L. Sastre; S.M. Bascon; and F.J.L. Herrero. MELECON 2006—2006 IEEE Mediterranean Electrotechnical Conference. Date of Conference: May 16-19, 2006. IEEE Xplore: Jul. 24, 2006. (Year: 2006).*
(Continued)

*Primary Examiner* — Sara C Hamilton
(74) *Attorney, Agent, or Firm* — Sughrue Mion, PLLC

(57) ABSTRACT

The purpose of the present invention is to transfer value, the balance of which is managed by a server, to a terminal that does not have online connection function. An electronic money server 2 records the balance of a value in a state in which the balance is related to an electronic money card 4
(Continued)

or a portable terminal 5. An off-line payment terminal 7 is not provided with communication network connection function and cannot communicate with the electronic money server 2 directly. On the other hand, the portable terminal 5 can connect to the electronic money server 2 via the Internet 3. Thus, the off-line payment terminal 7 connects to the electronic money server 2 by using the portable terminal 5 as a relay device by using the communication network connection function of the portable terminal 5 at the time of payment. In this way, the electronic money server 2 can connect to the off-line payment terminal 7 and make payment by using the value of the account of the portable terminal 5.

5 Claims, 16 Drawing Sheets

(51) Int. Cl.
  *G06Q 20/06* (2012.01)
  *G06Q 20/20* (2012.01)
  *G06Q 20/34* (2012.01)
(58) Field of Classification Search
  USPC .......................................................... 705/35
  See application file for complete search history.

(56) References Cited

U.S. PATENT DOCUMENTS

| | | | |
|---|---|---|---|
| 2005/0269399 A1 | 12/2005 | Bensimon et al. | |
| 2006/0004656 A1* | 1/2006 | Lee | G06Q 20/04 705/39 |
| 2006/0080322 A1* | 4/2006 | Akashika | G06Q 20/327 |
| 2006/0100933 A1* | 5/2006 | Fujita | G06Q 20/10 705/26.35 |
| 2007/0194104 A1* | 8/2007 | Fukuda | G06Q 20/3437 235/379 |
| 2007/0260562 A1* | 11/2007 | Hutson | G06Q 20/14 705/412 |
| 2008/0126261 A1 | 5/2008 | Lovett | |
| 2008/0166995 A1* | 7/2008 | Sun | G06Q 20/085 455/406 |
| 2008/0197186 A1* | 8/2008 | Yamada | G06Q 20/06 235/375 |
| 2008/0197190 A1* | 8/2008 | Fujita | G06Q 20/0655 235/380 |
| 2008/0208741 A1* | 8/2008 | Arthur | G06Q 20/105 705/41 |
| 2008/0208743 A1* | 8/2008 | Arthur | G06Q 40/00 705/41 |
| 2008/0208762 A1* | 8/2008 | Arthur | G06Q 20/027 705/79 |
| 2008/0230601 A1* | 9/2008 | Suzuki | G06Q 20/06 235/380 |
| 2008/0272189 A1* | 11/2008 | Shite | G06Q 20/32 235/379 |
| 2009/0050690 A1* | 2/2009 | Son | G06Q 20/0655 235/379 |
| 2009/0050691 A1* | 2/2009 | Matsumoto | G06Q 20/06 235/379 |
| 2009/0095805 A1* | 4/2009 | Matsumoto | G07F 19/00 235/379 |
| 2009/0112709 A1* | 4/2009 | Barhydt | G06Q 20/10 705/14.27 |
| 2009/0281881 A1* | 11/2009 | Hara | G06Q 20/06 705/14.1 |
| 2009/0281947 A1* | 11/2009 | Erel | G06Q 20/40 705/44 |
| 2010/0036742 A1* | 2/2010 | Ito | G06Q 20/202 705/21 |
| 2010/0125510 A1* | 5/2010 | Smith | G06Q 20/105 705/17 |
| 2010/0306837 A1* | 12/2010 | Ueno | G06F 21/35 726/7 |
| 2010/0312681 A1* | 12/2010 | Sogo | G06Q 20/02 705/35 |
| 2010/0317318 A1* | 12/2010 | Carter | G06Q 20/20 455/408 |
| 2011/0131102 A1 | 6/2011 | Wang | |
| 2011/0166992 A1* | 7/2011 | Dessert | G06Q 20/0655 705/39 |
| 2012/0036067 A1* | 2/2012 | Lee | G06Q 20/0655 705/41 |
| 2012/0040748 A1* | 2/2012 | Kanisawa | G06Q 20/06 463/25 |
| 2012/0136780 A1* | 5/2012 | El-Awady | G06Q 20/14 705/40 |
| 2012/0150669 A1* | 6/2012 | Langley | G06Q 30/0601 705/16 |
| 2012/0239567 A1* | 9/2012 | Choi | G07F 7/0886 705/41 |
| 2012/0330830 A1* | 12/2012 | Mason | G06Q 20/36 705/41 |
| 2013/0103524 A1 | 4/2013 | Springer et al. | |
| 2013/0124410 A1* | 5/2013 | Kay | G06Q 40/02 705/43 |
| 2013/0238494 A1* | 9/2013 | Kanisawa | G06Q 20/00 705/39 |

FOREIGN PATENT DOCUMENTS

| | | |
|---|---|---|
| EP | 2 061 001 A1 | 5/2009 |
| GB | 2 383 176 A | 6/2003 |
| JP | 2001-23015 A | 1/2001 |
| JP | 2003-317020 A | 11/2003 |
| JP | 2004-62511 A | 2/2004 |
| JP | 2004-133693 A | 4/2004 |
| JP | 2004-171527 A | 6/2004 |
| JP | 2004-348325 A | 12/2004 |
| JP | 2005-115876 A | 4/2005 |
| JP | 2005-251056 A | 9/2005 |
| JP | 2007-241448 A | 9/2007 |
| JP | 2007-310872 A | 11/2007 |
| JP | 2008-305112 A | 12/2008 |
| JP | 2011-81498 A | 4/2011 |
| JP | 2011-186660 A | 9/2011 |
| KR | 10-2011-0006736 A | 1/2011 |
| WO | 01/09851 A1 | 2/2001 |
| WO | 01/45058 A1 | 6/2001 |
| WO | 2010/019668 A2 | 2/2010 |

OTHER PUBLICATIONS

Communication from European Patent Office dated Jul. 22, 2015 in a counterpart European Patent Application No. 12 86 3149.
International Search Report for PCT/JP2012/083884 dated Feb. 5, 2013.
International Search Report for PCT/JP2012/083808 dated Feb. 19, 2013.
Communication from the European Patent Office dated May 27, 2015 in a counterpart European Patent Application No. 12 86 1460.
Summary of the Summons to Oral Proceedings regarding the family European application (No. 12861460.9) from the European Patent Office (issued Feb. 26, 2018).

* cited by examiner

Fig. 4(a)

USER DB

| IDENTIFICATION INFORMATION | ACCOUNT NUMBER | AUTHENTICATION INFORMATION | BALANCE | ... |
|---|---|---|---|---|
| 4 2 5 ... | 8 6 4 ... | 5 2 4 ... | 1 2 5 7 0 | ... |
| 1 5 9 ... | 6 3 2 ... | 6 9 3 ... | 5 6 0 0 | ... |
| ⋮ | ⋮ | ⋮ | ⋮ | ⋮ |

Fig. 4(b)

MEMBER STORE DB

| MEMBER STORE ID | PAYMENT TERMINAL ID | ... |
|---|---|---|
| 6 5 4 ... | 7 6 1 ... | ... |
| 3 2 8 ... | 9 6 7 ... | ... |
| ⋮ | ⋮ | ⋮ |

INFORMATION PROCESSING SERVER, INFORMATION PROCESSING METHOD, INFORMATION PROCESSING PROGRAM PRODUCT, RECORDING MEDIUM ON WHICH INFORMATION PROCESSING PROGRAM PRODUCT IS RECORDED, PORTABLE TERMINAL, INFORMATION PROCESSING METHOD EXECUTED BY HANDHELD COMPUTER, PROGRAM PRODUCT FOR PORTABLE TERMINAL, AND RECORDING MEDIUM ON WHICH PROGRAM PRODUCT FOR PORTABLE TERMINAL IS RECORDED

CROSS REFERENCE TO RELATED APPLICATIONS

This application is a National Stage of International Application No. PCT/JP2012/083884, filed on Dec. 27, 2012, which claims priority from Japanese Patent Application No. 2011-290191, filed on Dec. 28, 2011, the contents of all of which are incorporated herein by reference in their entirety.

TECHNICAL FIELD

The present invention relates to information processing servers, information processing methods, information processing program products, recording media on which an information processing program product is recorded, portable terminals, information processing methods executed by a handheld computer, program products for a portable terminal, and recording media on which a program product for a portable terminal is recorded, and relates to, for example, those processing electronic money.

BACKGROUND ART

In recent years, there has been an increase in use of electronic money. In electronic money, money amount information called a value is related to money value and, by increasing or decreasing the value, fund settlement is made.

FIG. 15 is a diagram for explaining an existing electronic money system.

An electronic money card 92 is an IC card carried by the user, and, on a built-in IC chip, the balance of a value, an IC chip ID for identification of the IC chip, an electronic money number, and so forth are recorded.

A payment terminal 91 is installed in a store and so forth, performs short-distance radio communication with the electronic money card 92, and executes payment by a value by increasing or decreasing the value of the electronic money card 92. The payment terminal 91 records the history of transactions with the electronic money card 92 as log data and transmits the log data collectively to an electronic money server 2 at regular or irregular intervals.

FIG. 16 is a flowchart for explaining payment processing performed by the existing electronic money system.

First, an user sets, on the payment terminal 91, the electronic money card 92 on which a value used for payment is recorded.

Next, the payment terminal 91 receives the input of payment amount information from an employee or the like of a store (step 5). Then, the payment terminal 91 performs polling on the IC chip of the electronic money card 92 (step 10).

In response to this, the IC chip returns a response to the payment terminal 91 (step 15). At this time, the IC chip transmits the IC chip ID thereof to the payment terminal 91.

When receiving the response from the IC chip, the payment terminal 91 requests an electronic money number from the IC chip (step 20). The electronic money number is information by which the IC chip is identified in the electronic money server 2.

When there is a request for the electronic money number from the payment terminal 91, the IC chip transmits the electronic money number to the payment terminal 91 (step 25).

When receiving the electronic money number from the IC chip, the payment terminal 91 requests authentication information from the IC chip (step 30).

In response to this, the IC chip transmits the authentication information to the payment terminal 91 (step 35).

The payment terminal 91 receives the authentication information from the IC chip, authenticates the IC chip, and requests the IC chip to provide notification of the balance of the value (step 40).

When receiving a balance request from the payment terminal 91, the IC chip transmits the balance of the value that is currently recorded thereon to the payment terminal 91 (step 45).

When receiving the balance from the IC chip, the payment terminal 91 requests the IC chip to perform balance update in such a way as to update the balance of the value to a money amount after payment (step 50).

When receiving the balance update request from the payment terminal 91, the IC chip updates the balance of the value (step 55) and transmits an update completion notification to the payment terminal 91 (step 60).

When receiving the update completion notification from the IC chip, the payment terminal 91 creates log data about the payment made this time and ends the payment processing.

The payment terminal 91 accumulates the log data in this way and transmits the log data to the electronic money server 2 by batch processing later (for example, about once a day) (step 65). The electronic money server 2 receives the log data from the payment terminal 91 and records the log data (step 70).

As described above, in the existing example, the balance of a value is recorded on the electronic money card 92 and is processed locally between the electronic money card 92 and the payment terminal 91. Therefore, the existing example does not manage the balance in real time on the electronic money server 2 side.

On the other hand, in a "server controlling payment system" of Patent Document 1, a technique of recording the balance of an electronic value on a server with the balance being related to a prepaid card, reading the prepaid card by a card reader installed in a store, and making payment with the balance of the electronic value recorded on the server, the balance being related to the prepaid card, is disclosed.

With the technique of Patent Document 1, to check the balance to be managed on the server side, the payment terminal is connected to the server online at the time of payment. Therefore, this technique cannot be applied to a case where a payment terminal having the online connection function cannot be installed from the viewpoint of a physical environment, cost performance, and so forth.

CITATION LIST

Patent Literature

Patent Document 1: JP-A-2004-171527

DISCLOSURE OF INVENTION

Problem to be Solved by the Invention

An object of the present invention is to make it possible to perform, between a server and a terminal having no online connection function, fund transfer transaction by a value whose balance is managed in the server.

SUMMARY OF THE INVENTION

The invention described in claim 1 provides an information processing server comprising: a balance change instruction acquiring unit that acquires, from a paying-side terminal, a balance change instruction transmitted from a receiving-side terminal to the paying-side terminal; a balance updating unit that updates a balance stored in a storing unit in a state in which the balance is related to the paying-side terminal, the storing unit storing a balance of an electronic value, based on the acquired balance change instruction; and a balance change response sending unit that sends a balance change response to the acquired balance change instruction back to the receiving-side terminal via the paying-side terminal.

The invention described in claim 2 provides the information processing server according to claim 1, further comprising: an identification information acquiring unit that acquires identification information from the paying-side terminal including a unit that reads, from a temporary storing unit, response information corresponding to request information when acquiring the request information from the receiving-side terminal and sending the response information back to the receiving-side terminal; and a unit that transmits, to the paying-side terminal, data stored in the storing unit in a state in which the data is related to the acquired identification information and makes the temporary storing unit store the data.

The invention described in claim 3 provides the information processing server according to claim 1 or 2, wherein the storing unit is able to store a balance of each type of an electronic value, the information processing server further includes a type identifying unit that identifies a type of an electronic value based on data that is transmitted from the receiving-side terminal, and the balance updating unit updates a balance of an electronic value corresponding to the identified type, the electronic value of electronic values stored in the storing unit in a state in which the electronic values are related to the paying-side terminal.

The invention described in claim 4 provides the information processing server according to claim 1 or 2, wherein the storing unit is able to store a balance of each type of an electronic value, the information processing server further includes a type identifying unit that identifies a type of an electronic value based on data that is transmitted from the receiving-side terminal, the balance updating unit updates a balance of an electronic value that does not correspond to the identified type, the electronic value of electronic values stored in the storing unit in a state in which the electronic values are related to the paying-side terminal, and the information processing server further includes a fund transfer information outputting unit that outputs fund transfer information including the identified type of an electronic value.

The invention described in claim 5 provides an information processing method executed by a computer, the method comprising: a balance change instruction acquiring step of acquiring, from a paying-side terminal, a balance change instruction transmitted from a receiving-side terminal to the paying-side terminal; a balance updating step of updating a balance stored in a storing unit in a state in which the balance is related to the paying-side terminal, the storing unit storing a balance of an electronic value, based on the acquired balance change instruction; and a balance change response sending step of sending a balance change response to the acquired balance change instruction back to the receiving-side terminal via the paying-side terminal.

The invention described in claim 6 provides an information processing program product that makes a computer implement: a balance change instruction acquiring function of acquiring, from a paying-side terminal, a balance change instruction transmitted from a receiving-side terminal to the paying-side terminal; a balance updating function of updating a balance stored in a storing unit in a state in which the balance is related to the paying-side terminal, the storing unit storing a balance of an electronic value, based on the acquired balance change instruction; and a balance change response sending function of sending a balance change response to the acquired balance change instruction back to the receiving-side terminal via the paying-side terminal.

The invention described in claim 7 provides a recording medium on which an information processing program product is recorded, the information processing program product that makes a computer implement: a balance change instruction acquiring function of acquiring, from a paying-side terminal, a balance change instruction transmitted from a receiving-side terminal to the paying-side terminal; a balance updating function of updating a balance stored in a storing unit in a state in which the balance is related to the paying-side terminal, the storing unit storing a balance of an electronic value, based on the acquired balance change instruction; and a balance change response sending function of sending a balance change response to the acquired balance change instruction back to the receiving-side terminal via the paying-side terminal.

The invention described in claim 8 provides a portable terminal comprising: an identification information transmitting unit that transmits unique identification information to an information processing server; a balance change instruction transferring unit that transfers, to the information processing server, a balance change instruction transmitted from a receiving-side terminal and makes the information processing server update a balance stored in a storing unit in a state in which the balance is related to the identification information, the storing unit storing a balance of an electronic value; and a balance change response transferring unit that transfers a balance change response to the balance change instruction, the balance change response transmitted from the information processing server, to the receiving-side terminal.

The invention described in claim 9 provides the portable terminal according to claim 8, further comprising: a unit that acquires, from the information processing server, data stored in the storing unit in a state in which the data is related to the identification information and makes a temporary storing unit store the data; and a unit that reads, from the temporary storing unit, response information corresponding to request information when acquiring the request information from the receiving-side terminal and sends the response information back to the receiving-side terminal.

The invention described in claim 10 provides the portable terminal according to claim 8 or 9, further comprising: an authenticating unit that authenticates a payer based on authentication information input from an outside, wherein the identification information transmitting unit transmits the identification information to the information processing server only when authentication by the authenticating unit is performed successfully.

The invention described in claim 11 provides an information processing method executed by a handheld computer, the method comprising: an identification information transmitting step of transmitting unique identification information to an information processing server; a balance change instruction transferring step of transferring, to the information processing server, a balance change instruction transmitted from a receiving-side terminal and making the information processing server update a balance stored in a storing unit in a state in which the balance is related to the identification information, the storing unit storing a balance of an electronic value; and a balance change response transferring step of transferring a balance change response to the balance change instruction, the balance change response transmitted from the information processing server, to the receiving-side terminal.

The invention described in claim 12 provides a program product for a portable terminal, the program product that makes a handheld computer implement: an identification information transmitting function of transmitting unique identification information to an information processing server; a balance change instruction transferring function of transferring, to the information processing server, a balance change instruction transmitted from a receiving-side terminal and making the information processing server update a balance stored in a storing unit in a state in which the balance is related to the identification information, the storing unit storing a balance of an electronic value; and a balance change response transferring function of transferring a balance change response to the balance change instruction, the balance change response transmitted from the information processing server, to the receiving-side terminal.

The invention described in claim 13 provides a recording medium on which a program product for a portable terminal is recorded, the program product that makes a handheld computer implement: an identification information transmitting function of transmitting unique identification information to an information processing server; a balance change instruction transferring function of transferring, to the information processing server, a balance change instruction transmitted from a receiving-side terminal and making the information processing server update a balance stored in a storing unit in a state in which the balance is related to the identification information, the storing unit storing a balance of an electronic value; and a balance change response transferring function of transferring a balance change response to the balance change instruction, the balance change response transmitted from the information processing server, to the receiving-side terminal.

Effect of the Invention

According to the present invention, even when a terminal having no online connection function is used, it is possible to manage a balance in a server. Moreover, it is possible to perform, between the server and the terminal having no online connection function, fund transfer transaction by a value whose balance is managed in the server.

BRIEF DESCRIPTION OF DRAWINGS

FIG. 4 is a diagram for explaining databases of the electronic money server;

Figure 1:
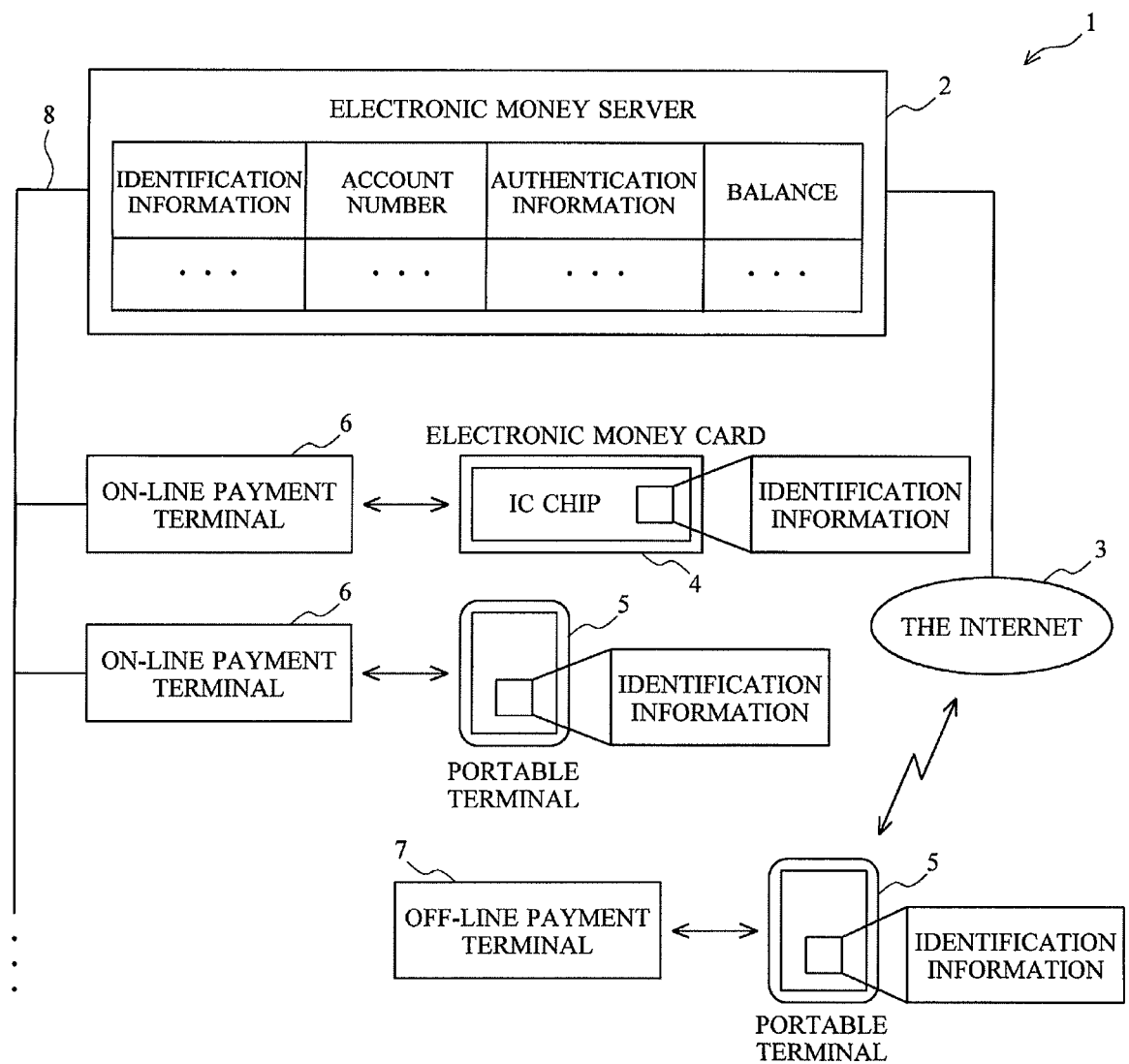
FIG. 1 is a diagram for explaining the network configuration of an electronic money system according to a first embodiment.

BEST MODES FOR CARRYING OUT THE INVENTION (1) Outline of a First Embodiment

An electronic money server 2 records the balance of a value in a state in which the balance is related to an electronic money card 4 or a portable terminal 5.

An on-line payment terminal 6 has the function of connecting to the electronic money server 2 via a communication line 8 and the function of connecting to the electronic money card 4 and the portable terminal 5 via short-distance radio communication.

In addition, the electronic money server 2 connects to the electronic money card 4 or the portable terminal 5 via the on-line payment terminal 6 at the time of payment, identifies the account of the electronic money card 4 or the portable terminal 5, and makes payment by using the value of the account.

In recent years, thanks to the advancement of the communication network technology, it has become possible to manage the balance of a value by a server in this way.

An off-line payment terminal 7 does not have the always-on connection function and cannot perform communication directly with the electronic money server 2 every time payment is made. On the other hand, the portable terminal 5 can connect to the electronic money server 2 via the Internet 3.

Thus, the off-line payment terminal 7 connects to the electronic money server 2 by using the portable terminal 5 as a relay device by using the communication network connection function of the portable terminal 5 at the time of payment.

In this way, the electronic money server 2 can connect to the off-line payment terminal 7 and make payment by using the value of the account of the portable terminal 5.

(2) Details of the First Embodiment

FIG. 1 is a diagram for explaining the network configuration of an electronic money system 1 according to the first embodiment.

The electronic money system 1 is configured by using the electronic money server 2, the Internet 3, the electronic money card 4, the portable terminal 5, the on-line payment terminal 6, the off-line payment terminal 7, the communication line 8, and so forth.

The electronic money server 2 is a server that manages the transfer of money value by a value. Here, a value is electronic information that is related to money value, and the electronic money system 1 transfers the money value by increasing or decreasing the balance of a value.

In addition, a business entity of the electronic money system 1 relates the transfer of a value to the transfer of actual money by transferring actual money in response to the transfer of a value.

The electronic money server 2 records, by using a user DB (database), an account number of an electronic money account, authentication information, the balance of a value, and so forth with the account number, the authentication information, the balance of a value, and so forth being related to identification information by which the electronic money card 4 and the portable terminal 5 are identified. As described above, the electronic money server 2 records the balance of a value with the balance being related to the electronic money card 4 and the portable terminal 5.

The electronic money card 4 is an IC card having a built-in IC chip. The IC chip may be any one of an IC chip of the noncontact type and an IC chip of the contact type; in this embodiment, the IC chip is assumed to be an IC chip of the noncontact type.

In the IC chip, a CPU (Central Processing Unit), ROM (Read Only Memory), RAM (Random Access Memory), an EEPROM (Electrically Erasable and Programmable ROM), and so forth are formed and forms a small computer.

The IC chip records, on the EEPROM or the like, identification information by which the electronic money server 2 identifies the IC chip. The identification information may be an IC chip ID assigned to the IC chip by a manufacturer of the IC chip or ID information assigned thereto by the electronic money server 2.

In the electronic money card 4, an antenna that connects to a high-frequency circuit of the IC chip is incorporated, and, with this antenna, the electronic money card 4 generates electric power for driving the IC chip and performs short-distance radio communication with the on-line payment terminal 6.

The portable terminal 5 is a portable terminal formed as a smartphone, a mobile telephone, a video game machine, a tablet computer, or the like, and has the function of connecting to the Internet 3 and the function of connecting to the on-line payment terminal 6 and the off-line payment terminal 7 via short-distance radio communication.

The portable terminal 5 records identification information by which the electronic money server 2 identifies the portable terminal 5.

The on-line payment terminal 6 is installed, for example, in an accounting counter, a vending machine, or the like of a member store (a store of a business operator using the electronic money system 1) such as a convenience store, performs short-distance radio communication with the electronic money card 4 and the portable terminal 5, and transmits the identification information thereof and the payment amount to the electronic money server 2 via the communication line 8.

The communication line 8 is a line connecting the electronic money server 2 and the on-line payment terminal 6. As the communication line 8, a dedicated line can be used or a general-purpose line such as the Internet 3 may also be used.

The off-line payment terminal 7 is installed, for example, in a store, a vending machine, and so forth that are not provided with adequate network equipment and has the function of performing short-distance radio communication with the portable terminal 5. The off-line payment terminal 7 does not constantly connect to the communication line 8 and, in this embodiment, connects to the electronic money server 2 via the portable terminal 5 every time payment processing is performed.

Next, the configuration of the portable terminal 5 will be described by using each diagram of FIG. 2. Here, as an example, the portable terminal 5 is assumed to be a smartphone, but the same goes for the mobile telephones and other portable terminals.

Figure 2A:
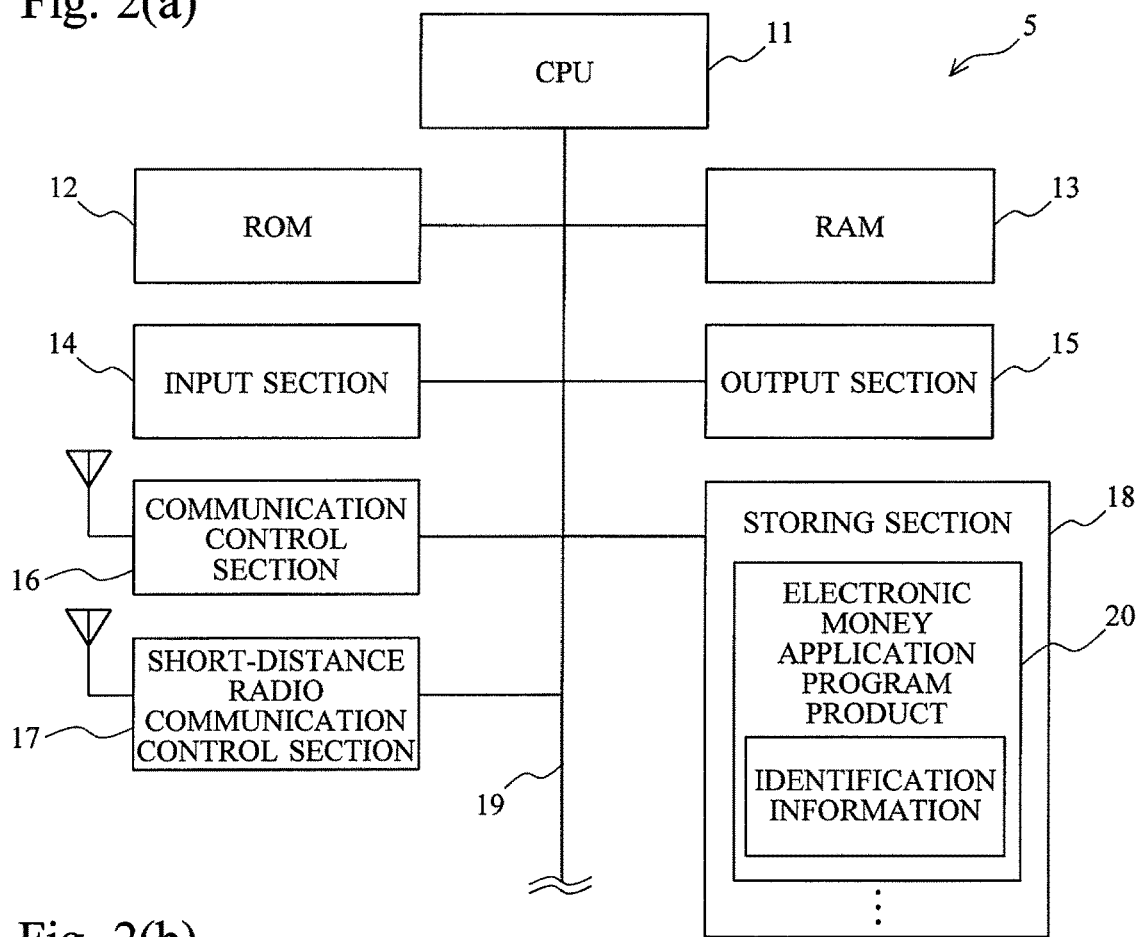
FIG. 2 is a diagram for explaining the configuration of a portable terminal.

FIG. 2(*a*) is a diagram depicting the hardware configuration of the portable terminal 5. The portable terminal 5 has a CPU 11, ROM 12, RAM 13, an input section 14, an output section 15, a communication control section 16, a short-distance radio communication control section 17, a storing section 18, and so forth which are connected to one another via a bus line 19.

The CPU 11 performs various kinds of information processing and overall control of the portable terminal 5 by executing the program products recorded on the ROM 12 and the storing section 18. In this embodiment, by executing an electronic money application program product 20, the CPU 11 mediates communication between the off-line payment terminal 7 and the electronic money server 2 and supports payment processing by a value.

The ROM 12 is read-only memory, and basic program products, parameters, data, and so forth required for the portable terminal 5 to operate are recorded thereon.

The RAM 13 is read/write memory and provides working memory when the CPU 11 performs information processing.

The output section 15 is a functional section that outputs information to the user and includes a liquid crystal display for screen display, a speaker that produces sound, and so forth. On the liquid crystal display, for example, an icon for starting the electronic money application program product 20 and a screen provided by an electronic money application 21 are displayed.

The input section 14 is a functional section for inputting information from the outside and includes a touch panel installed on the liquid crystal display, a microphone by which sound is input, a camera with which an image of a subject is taken, and so forth. The user can input information by touching the touch panel in response to the display on the liquid crystal display.

The storing section 18 is formed by using a recording medium such as an EEPROM or a hard disk and records an OS (Operating System) which is a basic program product controlling the portable terminal 5, the electronic money application program product 20, and other program products and data.

On the electronic money application program product 20, identification information by which the electronic money server 2 identifies the portable terminal 5 is recorded.

The communication control section 16 includes an antenna for performing radio communication with a base-station antenna of the mobile telephone network and connects the portable terminal 5 to the Internet 3 or the telephone line.

The short-distance radio communication control section 17 includes an antenna for performing short-distance radio communication with readers/writers of the on-line payment terminal 6 and the off-line payment terminal 7 and connects the portable terminal 5 to the on-line payment terminal 6 and the off-line payment terminal 7.

Figure 2B:
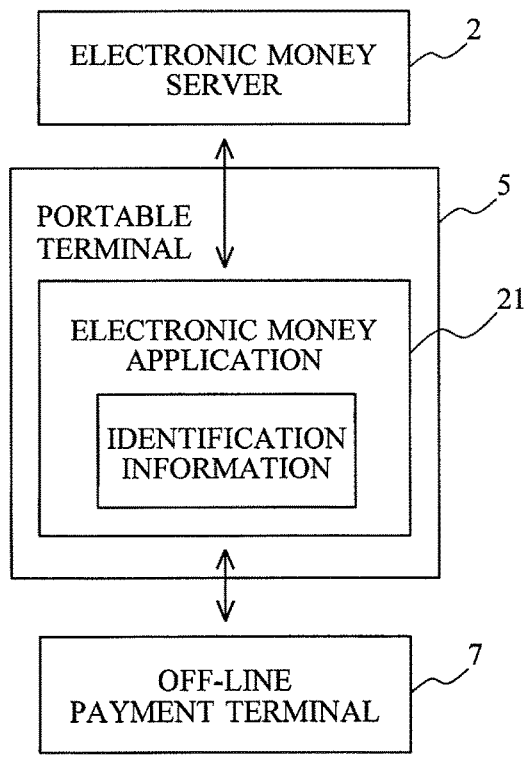

FIG. 2(b) is a block diagram for explaining the function of the portable terminal 5.

When the CPU 11 executes the electronic money application program product 20, the electronic money application 21 is formed in the portable terminal 5.

The electronic money application 21 transmits the identification information to the electronic money server 2 to make the electronic money server 2 identify the portable terminal 5, and relays communication between the electronic money server 2 and the off-line payment terminal 7. In this way, the off-line payment terminal 7 having no network communication function can connect to the electronic money server 2 by using the portable terminal 5 as a relay device.

Figure 2C:
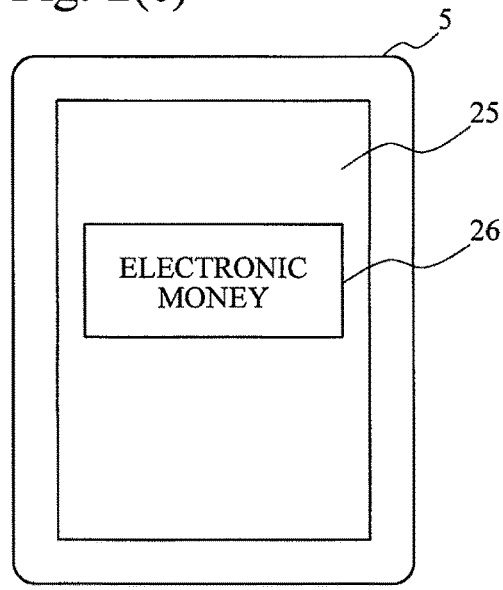

FIG. 2(c) is a diagram depicting the appearance of the portable terminal 5.

A touch panel 25 is installed all over the liquid crystal display of the portable terminal 5. On the liquid crystal display, an icon 26 for starting the electronic money application 21 is displayed, and, though not depicted in the drawing, icons for starting a browser, a game, and other applications are displayed.

By touching these icons, it is possible to start the applications corresponding to these icons. In this embodiment, when the user touches the icon 26 for starting the electronic money application 21, the electronic money application 21 is started.

Figure 3:
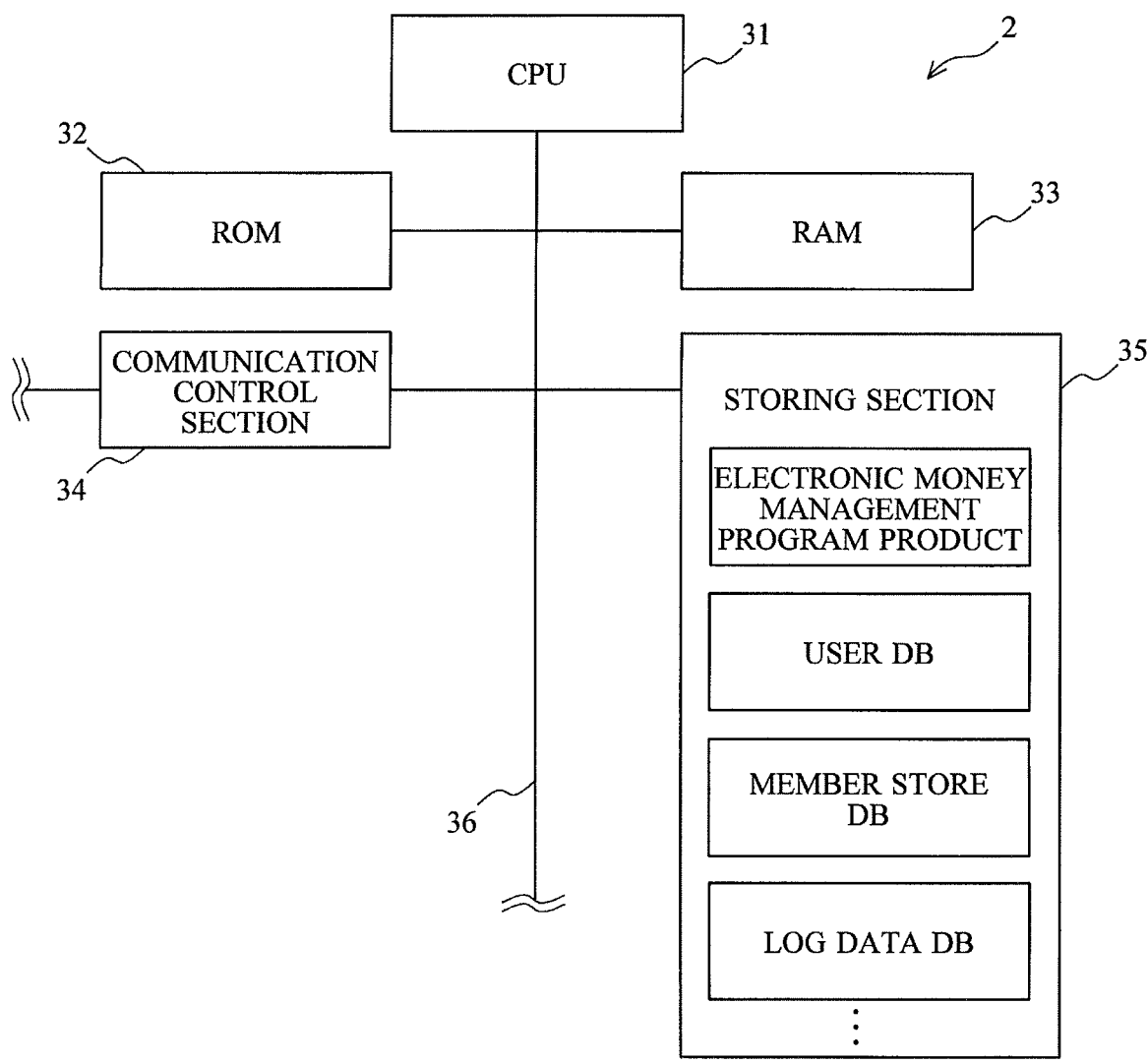
FIG. 3 is a diagram for explaining the configuration of an electronic money server.

FIG. 3 is a diagram for explaining the configuration of the electronic money server 2.

The electronic money server 2 has a CPU 31, ROM 32, RAM 33, a communication control section 34, a storing section 35, and so forth which are connected to one another via a bus line 36.

The CPU 31 performs various kinds of information processing and overall control of the electronic money server 2 by executing the program products recorded on the ROM 32 and the storing section 35.

In this embodiment, the CPU 31 performs payment processing by a value by updating the value balance of the user in real time while performing communication with the on-line payment terminal 6, the off-line payment terminal 7, the electronic money card 4, and the portable terminal 5.

The ROM 32 is read-only memory, and basic program products, parameters, data, and so forth required for the electronic money server 2 to operate are recorded thereon.

The RAM 33 is read/write memory and provides working memory when the CPU 31 performs information processing.

With the communication control section 34, the electronic money server 2 performs communication with the on-line payment terminal 6, the electronic money card 4, and the portable terminal 5 via the communication line 8 and performs communication with the off-line payment terminal 7 and the portable terminal 5 via the Internet 3.

The storing section 35 is formed of, for example, a large-capacity hard disk and records an electronic money management program product and other program products that are used by the CPU 31 to perform payment processing by a value, a user DB that manages the balance of the user, a member store DB that manages the value payment of the member store, a log data DB that stores log data recording each payment processing, and so forth.

Next, the databases of the electronic money server 2 will be described by using diagrams of FIG. 4.

FIG. 4(a) is a diagram for explaining the logical configuration of the user DB.

The user DB is formed of items such as "identification information", "account number", "authentication information", and "balance".

The item "identification information" is information by which the portable terminal 5 or the electronic money card 4 that is related to an electronic money account is identified.

The item "account number" is an account number of the electronic money account. Balance update is performed on the electronic money account.

The item "authentication information" is information used by the on-line payment terminal 6 and the off-line payment terminal 7 to authenticate the genuineness of the electronic money account to which payment is made. Although common authentication information can be used, in this embodiment, different pieces of authentication information are used for different pieces of identification information.

The item "balance" indicates the amount of the balance of a value accumulated in the electronic money account.

In this embodiment, the items "identification information", "account number", "authentication information", and "balance" are related to one another on a one-to-one basis, but various modifications are possible, such as payment is made from one electronic money account by using a plurality of portable terminals 5 by relating a plurality of pieces of identification information to one account number, for example.

FIG. 4(b) is a diagram for explaining the logical configuration of the member store DB.

The member store DB is formed of items such as "member store ID" and "payment terminal ID".

The item "member store ID" is information by which a business operator that gets payment service by electronic money, the service offered by the electronic money system 1, is identified.

The item "payment terminal ID" is information by which the on-line payment terminal 6 and the off-line payment terminal 7 are identified.

The on-line payment terminal 6 and the off-line payment terminal 7 notify the electronic money server 2 of the payment terminal IDs thereof when connecting thereto. As a result, the electronic money server 2 can identify the member store ID of the member store involved in fund transfer.

Incidentally, since a business operator generally installs a plurality of payment terminals in one store, a plurality of payment terminal IDs are generally related to one member store ID.

Moreover, since the payment amount of a commercial transaction performed in the member store is recorded on the log data in a state in which the payment amount is related to the member store ID, the member store ID functions as an account number of the member store.

Figure 5:
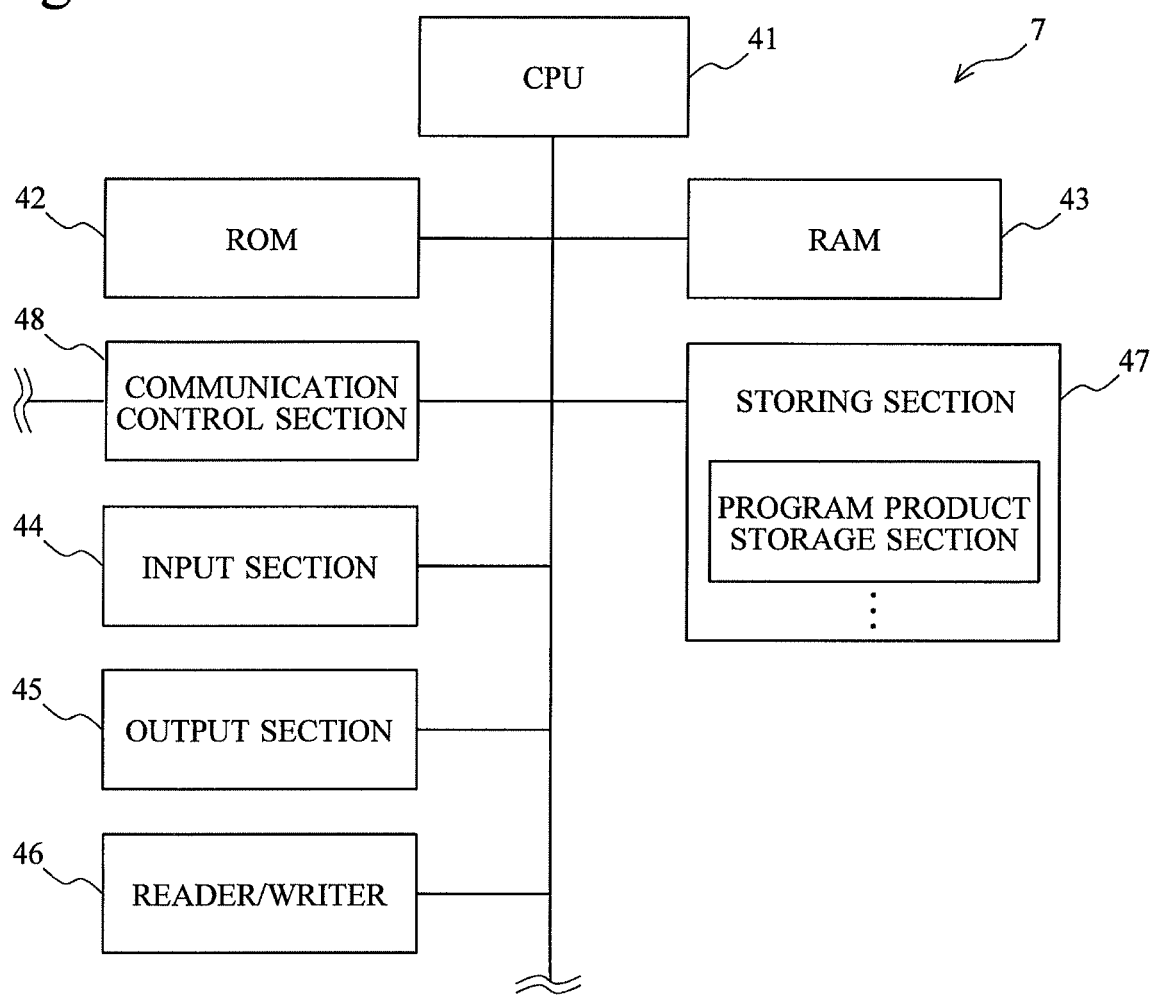
FIG. 5 is a diagram for explaining the configuration of an off-line payment terminal.

FIG. 5 is a diagram for explaining the configuration of the off-line payment terminal 7.

The off-line payment terminal 7 includes a CPU 41, ROM 42, RAM 43, an input section 44, an output section 45, a reader/writer 46, a storing section 47, and a communication control section 48.

The CPU 41 performs various kinds of information processing and overall control of the off-line payment terminal 7 by executing the program products recorded on the ROM 42 and the storing section 47.

In this embodiment, the CPU 41 performs communication with the electronic money server 2 via the portable terminal 5 and supports payment processing of the electronic money server 2 by notifying the electronic money server 2 of the payment amount.

The ROM 42 is read-only memory, and basic program products, parameters, data, and so forth required for the off-line payment terminal 7 to operate are recorded thereon.

The RAM 43 is read/write memory and provides working memory when the CPU 41 performs information processing.

The input section 44 includes, for example, an input device such as a touch panel or a keyboard installed on a liquid crystal display and accepts the input of the payment amount and the like.

The output section 45 includes a liquid crystal display that displays an image for touch panel input, a speaker that produces sound such as sound effect at the time of payment, and so forth.

The reader/writer 46 sends and receives data to and from the portable terminal 5 via short-distance communication between the portable terminal 5 and a built-in antenna.

On the storing section 47, a program product for making the CPU 41 fulfill the function of performing payment processing with the electronic money server 2, security data (for example, key data) (not depicted) used for authentication of the electronic money card, and so forth are recorded. Incidentally, on a common online payment terminal, security data is not recorded.

The communication control section 48 connects the electronic money server 2 and the off-line payment terminal 7 via the communication line 8 at intervals of a predetermined period, for example. Incidentally, the communication control section of the on-line payment terminal constantly connects the electronic money server and the on-line payment terminal via the communication line.

Figure 6:
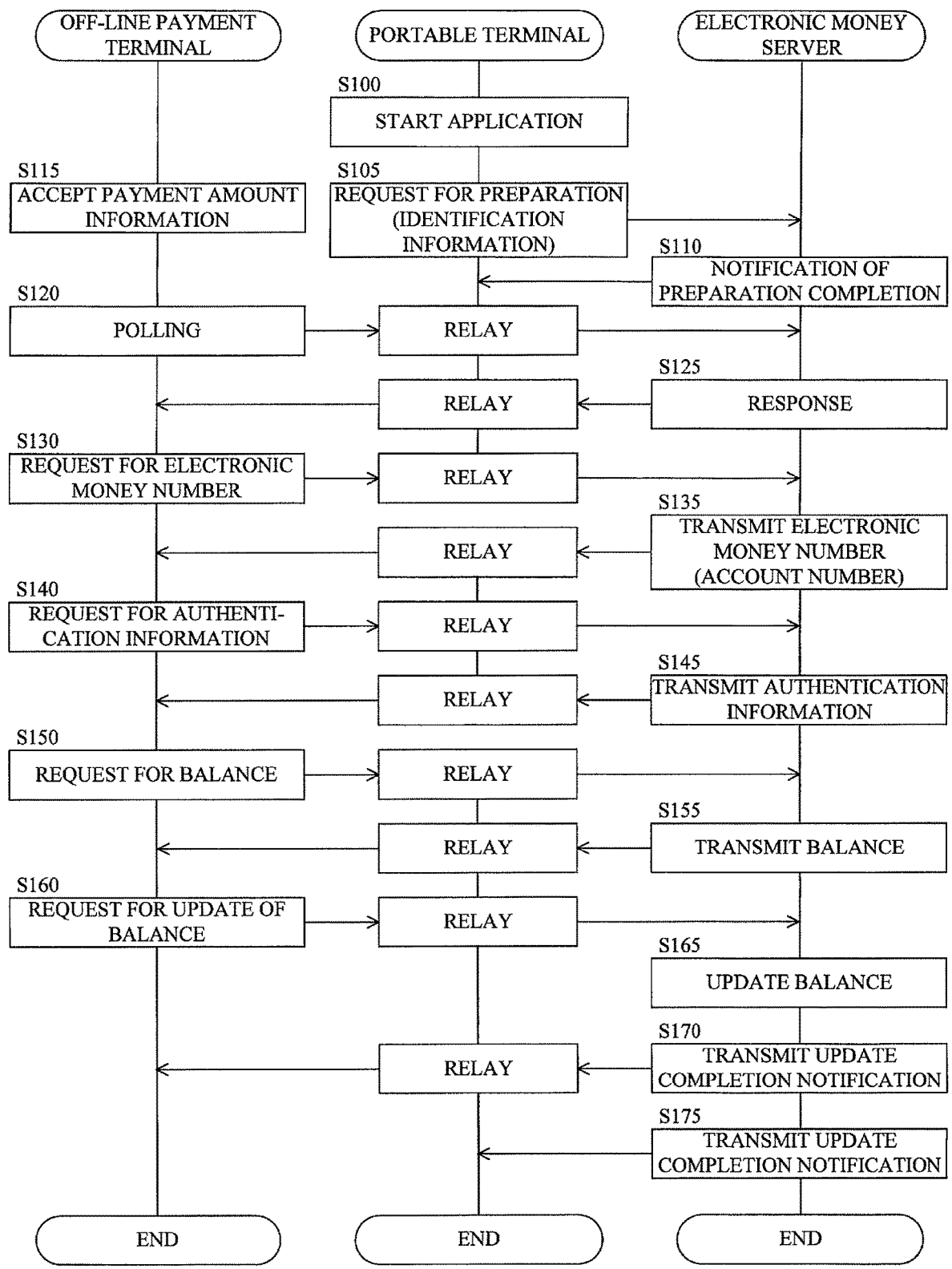
FIG. 6 is a flowchart for explaining payment processing of the first embodiment.

FIG. 6 is a flowchart for explaining payment processing that is performed by the electronic money server 2 when the off-line payment terminal 7 connects to the electronic money server 2 via the portable terminal 5.

The following processing is performed by the CPU 41 of the off-line payment terminal 7, the CPU 11 of the portable terminal 5, and the CPU 31 of the electronic money server 2 in accordance with a predetermined program product.

First, the user who makes payment in shopping or charging (processing in which cash is handed to a member store to increase the balance of a value only by the amount of cash) touches the icon 26 of the portable terminal 5 and thereby starts the electronic money application 21 (step 100).

This also can be configured in such a way that the electronic money application 21 is started after the user inputs a user ID or a password and the user ID or the password is authenticated. Moreover, it may be configured in such a way that biometric identity verification such as a finger print is used and the electronic money application 21 is started after authentication is performed.

Incidentally, in addition to charging performed in a store in this manner, charging is sometimes performed automatically by a credit card transaction when the balance of the user DB becomes a certain amount or less.

When the electronic money application 21 is started, the electronic money application 21 accesses the electronic money server 2 via the Internet 3 and makes a request for preparation by transmitting the identification information to the electronic money server 2 (step 105).

When receiving the identification information from the portable terminal 5, the electronic money server 2 searches the user DB for the identification information, identifies the electronic money account number, the authentication information, the balance of the value, and so forth which are related to the portable terminal 5, and transmits a preparation completion notification to the portable terminal 5 (step 110). When receiving the preparation completion notification, the portable terminal 5 enters a relay mode in which the portable terminal 5 relays communication between the off-line payment terminal 7 and the electronic money server 2.

On the other hand, after starting the electronic money application 21 in the portable terminal 5, the user sets the portable terminal 5 on the reader/writer 46 of the off-line payment terminal 7.

Next, the off-line payment terminal 7 accepts the payment amount information (step 115). The payment amount information includes, in addition to the payment amount, the direction of fund transfer as to whether the money amount is transferred from the user to the member store (when the user buys a product) or the money amount is transferred from the member store to the user (when charging is performed).

When receiving the payment amount information, the off-line payment terminal 7 performs polling on the portable terminal 5 (step 120). This polling is relayed (transferred) to the electronic money server 2 by the portable terminal 5. That is, the off-line payment terminal 7 performs polling on the electronic money server 2 via the portable terminal 5.

The electronic money server 2 receives the polling from the off-line payment terminal 7 by using the portable terminal 5 as a relay device and returns a response to the portable terminal 5 (step 125).

Then, the portable terminal 5 relays this response to the off-line payment terminal 7. That is, the electronic money server 2 returns a response to the off-line payment terminal 7 by using the portable terminal as a relay device.

Then, the off-line payment terminal 7 and the electronic money server 2 perform communication by using the portable terminal 5 as a relay device in a similar manner.

Figure 15:
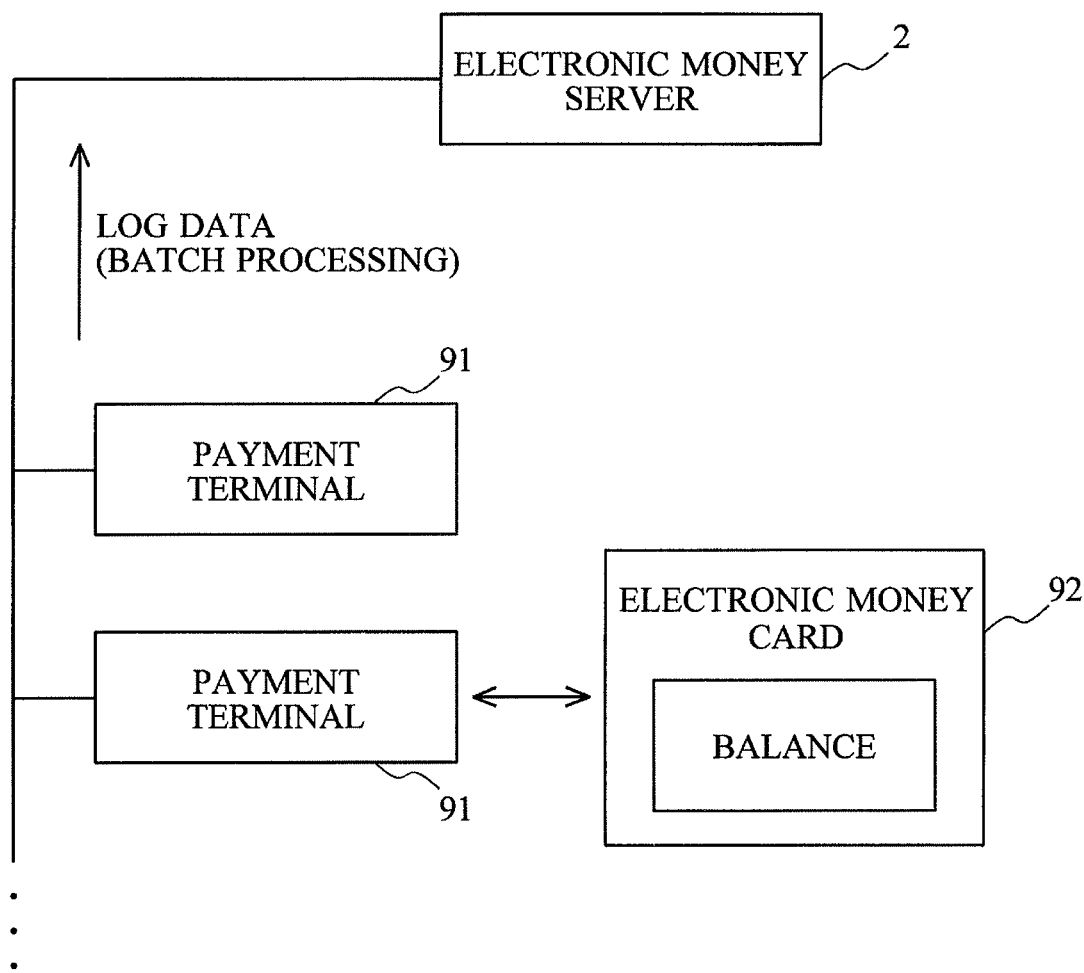
FIG. 15 is a diagram for explaining an existing electronic money system.
Figure 16:
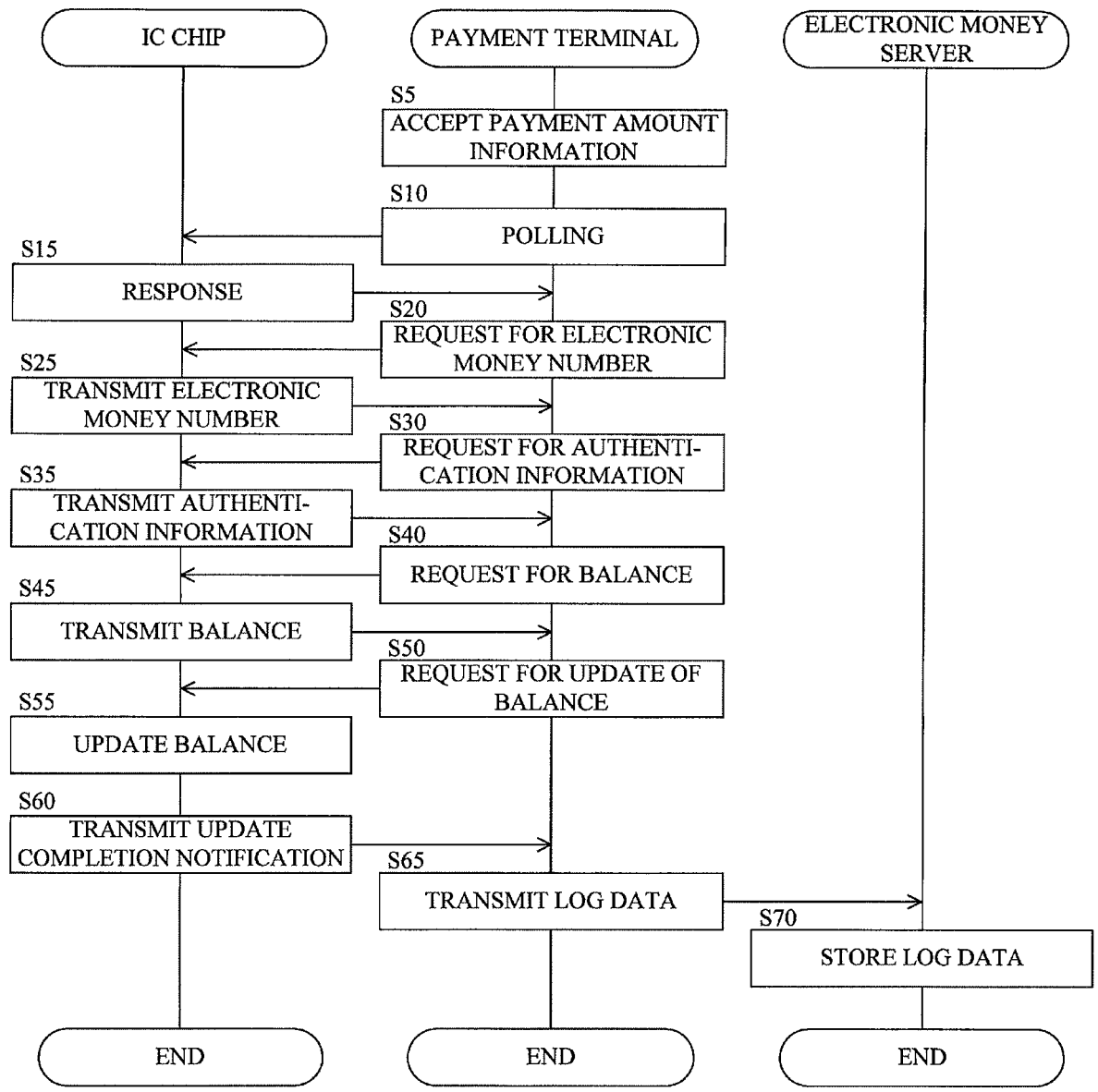
FIG. 16 is a flowchart for explaining payment processing performed by the existing electronic money system.

Incidentally, in the existing example of FIG. 15, the electronic money card 92 transmits an IC chip ID in response to the polling performed by the payment terminal 91. It is possible to make the electronic money server 2 transmit an IC chip ID to the off-line payment terminal 7 as a response in such away that compatibility with the existing payment terminal 91 is obtained (if there is compatibility, it is possible to minimize a change in specifications of the payment terminal 91).

In this case, a configuration is possible in which the portable terminal 5 records a pseudo IC chip ID imitating an IC chip ID with identification information and, for example, transmits it to the electronic money server 2 in response to a preparation request in step 105 or records the pseudo IC chip ID on the user DB of the electronic money server 2 with the pseudo IC chip ID being related to the identification information, and the electronic money server 2 transmits it to the off-line payment terminal 7 at the time of response.

When receiving the response from the electronic money server 2, the off-line payment terminal 7 requests an electronic money number from the electronic money server 2 (step 130).

In response to this, the electronic money server 2 transmits the account number identified by the identification information of the portable terminal 5 to the off-line payment terminal 7 as the electronic money number (step 135).

Next, the off-line payment terminal 7 requests authentication information from the electronic money server 2 (step 140), and the electronic money server 2 transmits authentication information to the off-line payment terminal 7 (step 145).

The off-line payment terminal 7 checks the genuineness of the party at the other end (that is, the electronic money server 2) by using the authentication information and requests the balance of the value from the electronic money server 2 (step 150).

In response to this, the electronic money server 2 transmits the balance of the value to the off-line payment terminal 7 (step 155).

When receiving the balance of the value from the electronic money server 2, the off-line payment terminal 7 requests the electronic money server 2 to update the balance (step 160).

This request can be performed by the following methods, for example.

(Method 1) A Case where an Overwriting Instruction is Transmitted as an Update Request.

In this case, the off-line payment terminal 7 performs addition or subtraction based on the payment amount information for the balance received from the electronic money server 2 and thereby calculates the balance after payment. Then, the off-line payment terminal 7 transmits, as a balance update request, an overwriting instruction by which the balance after calculation is overwritten. The electronic money server 2 overwrites the balance of the user DB in accordance with the overwriting instruction.

(Method 2) A Case where an Addition or Subtraction Instruction is Transmitted.

In this case, the off-line payment terminal 7 transmits, as a balance update request, an addition instruction or a subtraction instruction based on the payment amount information to the electronic money server 2. The electronic money server 2 performs addition or subtraction on the balance of the user DB in accordance with this instruction and updates the balance to a balance after addition or subtraction.

(Method 3) A Combination of Method 1 and Method 2.

For example, when the balance is increased, an overwriting instruction is used, and, when the balance is reduced, a subtraction instruction is used. Alternatively, when the balance is increased, an addition instruction is used, and, when the balance is reduced, an overwriting instruction is used.

When receiving the balance update request from the off-line payment terminal 7, the electronic money server 2 updates the balance of the user DB (step 165).

Then, the electronic money server 2 transmits an update completion notification to the off-line payment terminal 7 (step 170). Furthermore, the electronic money server 2 transmits the update completion notification also to the portable terminal 5 (step 175).

The update completion notification to be transmitted to the portable terminal 5 may be a display of a message saying that update has been completed, the display performed by the electronic money application 21, or electronic mail may be used.

After the balance update is completed, the electronic money server 2 generates log data related to this transaction and records the log data on the log data DB. The log data includes the identification information of the portable terminal 5, the terminal ID of the off-line payment terminal 7, the payment amount information, and history information such as payment date and time. For the member store, fund settlement is performed later based on the log data.

As described above, although the off-line payment terminal 7 does not have the always-on connection function, the off-line payment terminal 7 can establish network connection with the electronic money server 2 by using the network connection function of the portable terminal 5.

Moreover, since the electronic money server 2 returns, to the off-line payment terminal 7, information similar to the information of the electronic money card 92 in the existing example, the off-line payment terminal 7 performs communication as if the off-line payment terminal 7 performs communication with the existing electronic money card 92. That is, the off-line payment terminal 7 can perform communication by using the existing protocol. Therefore, it is possible to use the existing payment terminal 91 as the off-line payment terminal 7 and reduce the cost of capital investment.

Incidentally, in this embodiment, the payment amount information is generated in the off-line payment terminal 7 and is transmitted to the electronic money server 2, but a configuration in which the payment amount information is generated in the portable terminal 5 is also possible. In this case, the payment amount is input to the portable terminal 5.

Moreover, in this embodiment, the balance is recorded on the user DB and is increased or reduced, but this balance may be paid in advance by the user in a prepaid manner or may be a credit amount given to the user.

When the balance of the user DB is a credit amount, the accounts are adjusted by, for example, deducting the amount from the bank account of the user later.

Furthermore, a method in which the balance is not recorded on the user DB is also possible. In this case, the electronic money server 2 accumulates the transactions performed between the portable terminal 5 and the on-line payment terminal 6 and the off-line payment terminal 7 in the form of log data, compiles the log data at a cutoff date, and outputs the exchange of fund between the user and the member store. Then, the user and the member store adjust accounts separately based on the output data.

Modified Example 1

In this modified example, part of the information (such as an account number) is cached when the portable terminal 5 starts connecting to the electronic money server 2. By using the cached information, the portable terminal 5 itself can respond to the off-line payment terminal 7.

Thus, when the off-line payment terminal 7 requests cached information, the portable terminal 5 responds to the off-line payment terminal 7 by using the cached information without relaying the request to the electronic money server 2.

As described above, by responding to an instruction to which the portable terminal 5 can respond on its own and transferring an instruction to which the portable terminal 5 cannot respond on its own to the electronic money server 2, the portable terminal 5 can reduce the volume of data communication and reduce the turnaround time.

Figure 7:
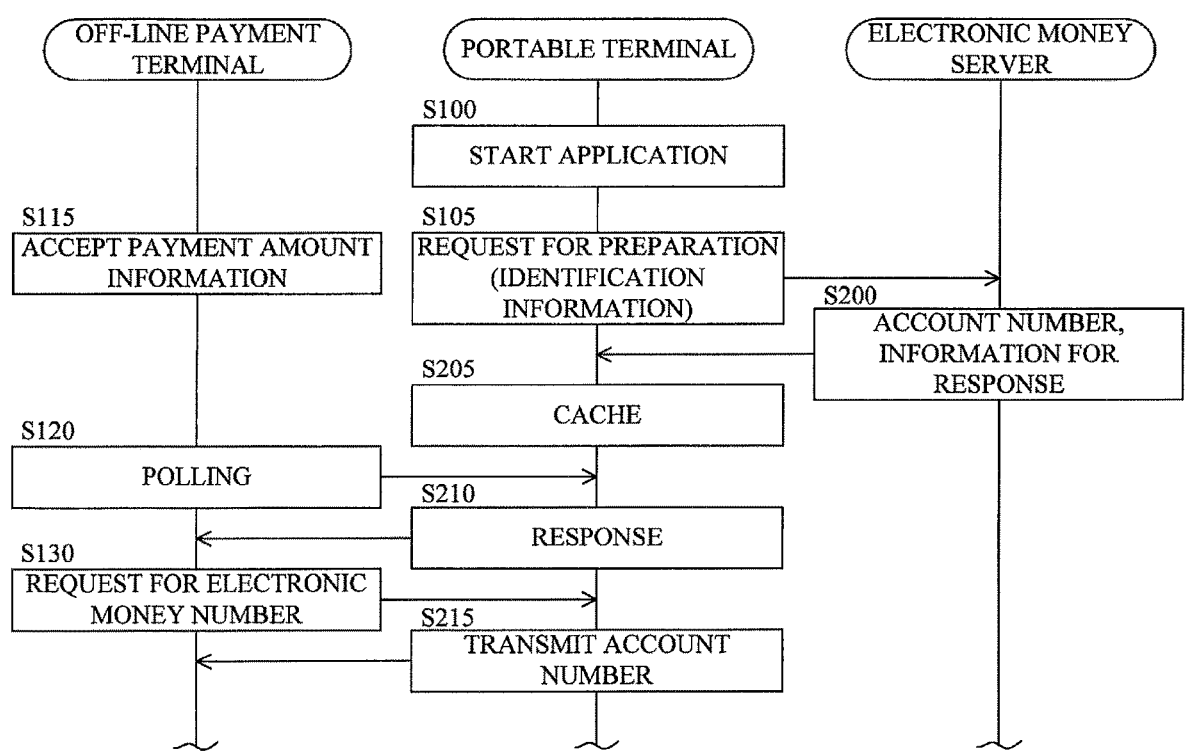
FIG. 7 is a flowchart for explaining Modified Example 1 of the first embodiment.

FIG. 7 is a flowchart for explaining a payment processing procedure according to Modified Example 1.

The same step is attached to the same operation as that in the first embodiment and the description thereof is simplified.

First, in the portable terminal 5, the electronic money application 21 is started (step 100) and a preparation request is transmitted to the electronic money server 2 (step 105).

When receiving the preparation request from the portable terminal 5, the electronic money server 2 transmits, to the portable terminal 5, the account number related to the identification information in the user DB and information (for example, a pseudo IC chip ID) needed for a response with a preparation completion notification (step 200).

When receiving the account number and the information needed for a response from the electronic money server 2, the portable terminal 5 caches the account number and the information by recording them on the RAM 13 (step 205).

On the other hand, the off-line payment terminal 7 accepts the payment amount information (step 115) and performs polling on the portable terminal 5 (step 120).

In response to this, the portable terminal 5 makes a response in place of the electronic money server 2 by using the information cached on the RAM 13 without relaying the polling to the electronic money server 2 (step 210).

Next, the off-line payment terminal 7 requests the electronic money number from the portable terminal 5 (step 130).

In response to this, the portable terminal 5 transmits the account number cached on the RAM 13 to the off-line payment terminal 7 without relaying the request to the electronic money server 2 (step 215).

The processing that follows the above processing is the same as that in FIG. 6.

Modified Example 2

When there are a plurality of business entities that offer payment service using a value, a value issued by each business entity generally cannot be used in the electronic money systems of the other business entities. In this case, incompatible values of different business entities, such as a value of company A, a value of company B, and . . . , are distributed.

In this modified example, a case where an attribute representing the type is associated with a value as described above and there is a need to make payment for each type will be described. Incidentally, in addition to a case where different business entities have different values, this modified example can be widely applied to a case where incompatible values are used.

Figure 8A:
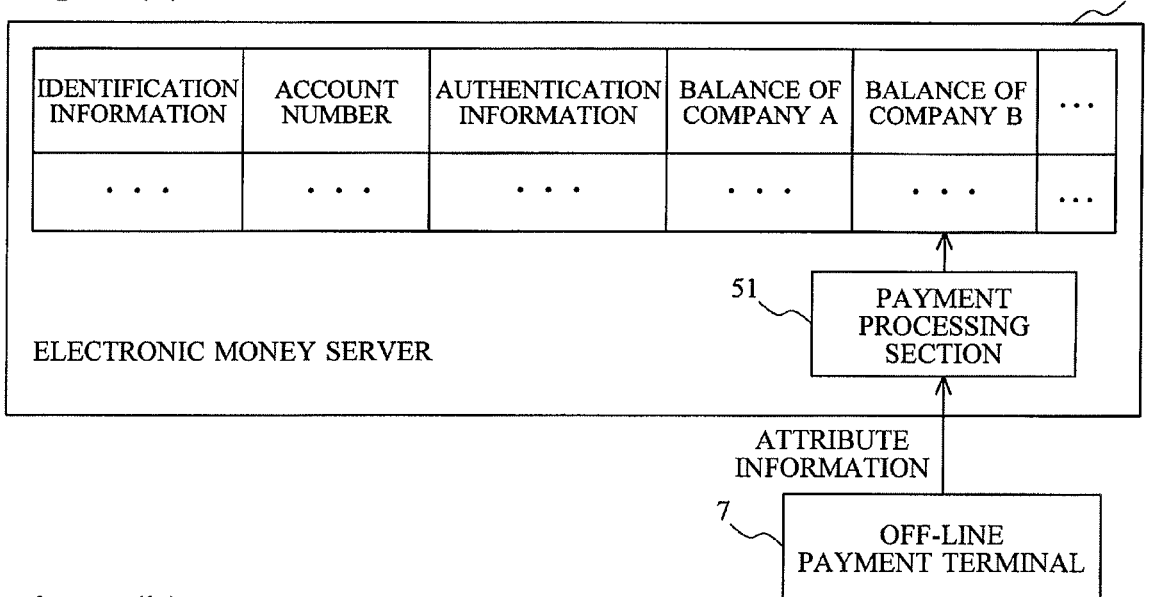
FIG. 8 is a diagram for explaining Modified Example 2 of the first embodiment.
Figure 8B:
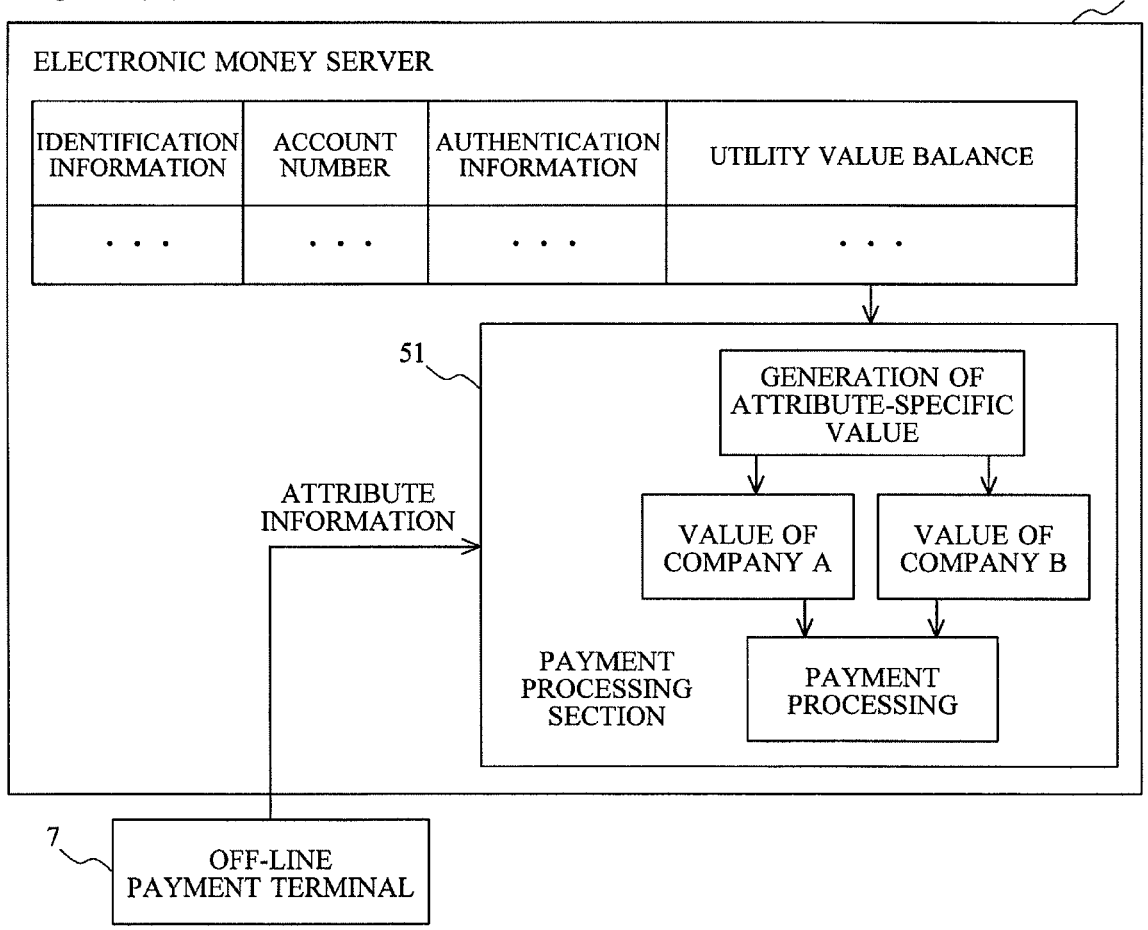

FIG. 8(*a*) is a diagram for explaining Modified Example 2.

On the user DB, the balances are recorded on a value type-by-value type basis as follows: Company A balance (the value balance for company A), Company B balance (the value balance for company B), and . . . .

When requesting payment, the off-line payment terminal 7 (the same goes for the on-line payment terminal 6) notifies the electronic money server 2 of the type of a value by which payment is to be made by transmitting the attribute of the value to the electronic money server 2.

A payment processing section 51 of the electronic money server 2 makes payment by using a value from the balance of the type identified by the attribute information.

FIG. 8 (*b*) is a diagram for explaining another example of Modified Example 2.

In this modified example, a utility value is used. The utility value is a value (for example, the balance of a saving account, the balance of a credit line, a prepaid payment means that can be converted into electronic money of the other type, and so forth) that can be converted into various types of values. For example, the utility value can be converted into a value of company A or a value of company B.

On the user DB, the balance of a utility value is recoded as the balance.

When requesting payment, the off-line payment terminal 7 (the same goes for the on-line payment terminal 6) notifies the electronic money server 2 of the type of a value by which payment is to be made by transmitting the attribute of the value to the electronic money server 2.

When amount reduction processing is performed, the payment processing section 51 of the electronic money server 2 generates, from the utility value, an attribute-specific value (for example, a value of company A and a value of company B) specified by the attribute information and performs payment processing. The balance of a utility value is reduced only by the payment amount irrespective of the type of a value used for payment.

When amount increase processing is performed, the payment processing section 51 generates the utility value from a type-specific value and increases the balance of a utility value.

The electronic money server 2 records the type of a value generated from the utility value on the log data, and compiles the log data later and adjusts accounts on a value-by-value basis.

Modified Example 3

In the first embodiment, payment is performed between the off-line payment terminal 7 and the portable terminal 5, but it is also possible to perform payment between the electronic money card 4 and the portable terminal 5 or between two portable terminals 5.

Figure 9A:
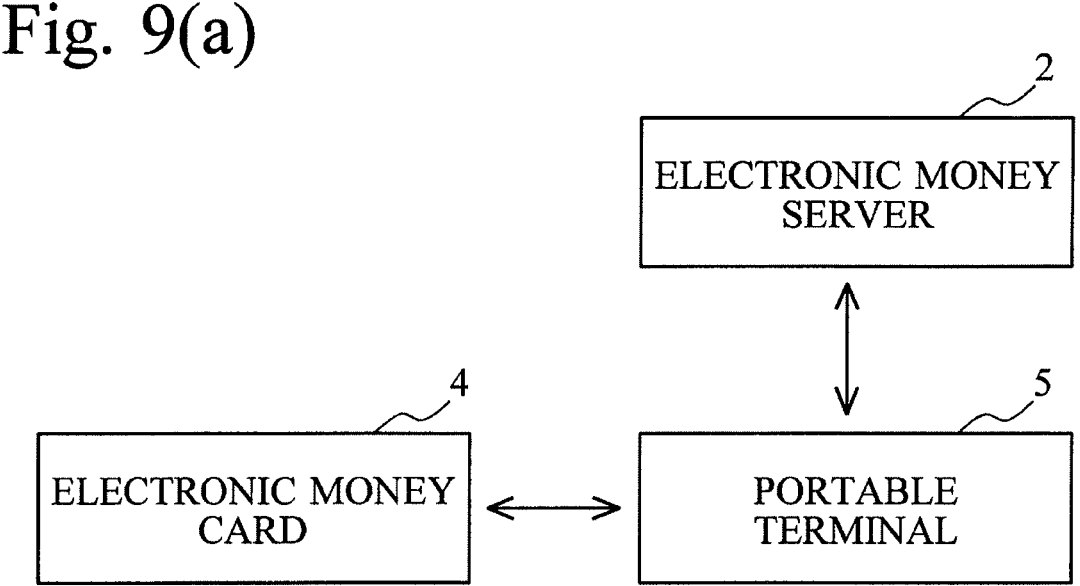
FIG. 9 is a diagram for explaining Modified Example 3 of the first embodiment.
Figure 9B:
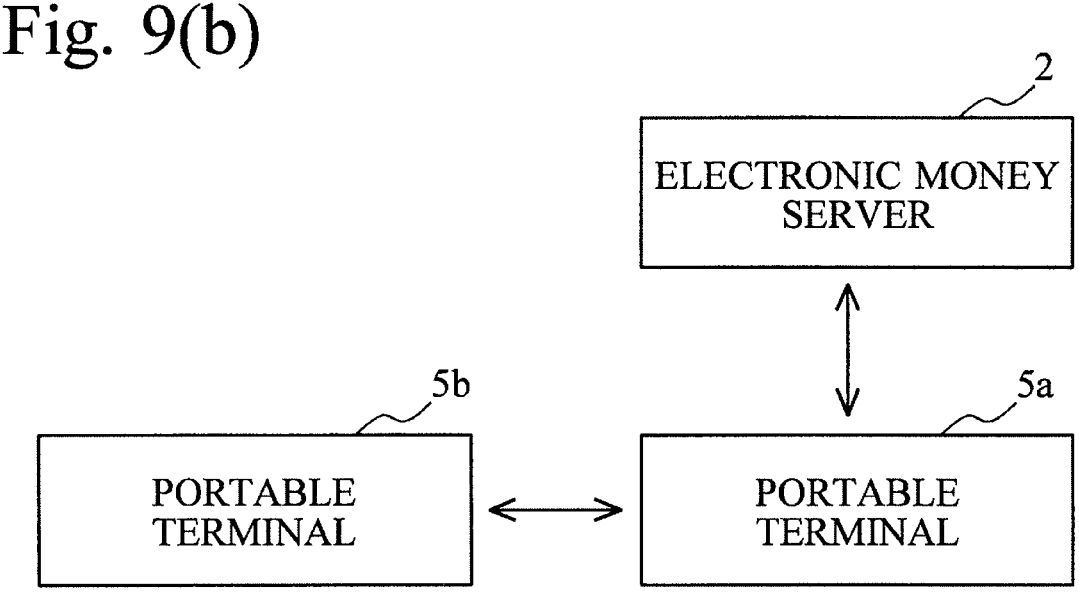

FIG. 9(*a*) is a diagram for explaining a case where payment is performed between the electronic money card 4 and the portable terminal 5.

The portable terminal 5 has the reader/writer function and can drive the electronic money card 4 by transmitting radio waves to the electronic money card 4.

The electronic money card 4 transmits identification information to the electronic money server 2 via the portable terminal 5, and the portable terminal 5 transmits the identification information thereof and payment amount information to the electronic money server 2.

The electronic money server 2 identifies two electronic money accounts on which payment is performed based on the identification information of the electronic money card 4 and the portable terminal 5 and performs fund transfer between the two accounts in accordance with the payment amount information. That is, the electronic money server 2 reduces the value in the account of a money transfer source only by the payment amount and increases the value in the account of a money transfer destination only by the payment amount.

FIG. 9(*b*) is a diagram for explaining a case in which payment is performed between two portable terminals 5.

A portable terminal 5*a* and a portable terminal 5*b* perform short-distance radio communication by Bluetooth (Bluetooth®) and infrared communication, for example. The portable terminal 5*a* transmits the identification information thereof to the electronic money server 2, and the portable terminal 5*b* transmits the identification information thereof to the electronic money server 2 by using the portable terminal 5*a* as a relay device.

Either the portable terminal 5*a* or the portable terminal 5*b* may generate the payment amount information; when the portable terminal 5*a* generates the payment amount information, the portable terminal 5*a* transmits the payment amount information directly to the electronic money server 2, and, when the portable terminal 5*b* generates the payment amount information, the portable terminal 5*b* transmits the payment amount information to the electronic money server 2 by using the portable terminal 5*a* as a relay device.

Based on the identification information of the portable terminal 5*a* and the portable terminal 5*b*, the electronic money server 2 identifies the two electronic money accounts on which payment is to be performed and performs fund transfer between the two accounts in accordance with the payment amount information.

Modified Example 4

In this modified example, an IC chip of the noncontact type is incorporated into a portable terminal.

Since the use of electronic money based on a value has started from the electronic money card 4 having a built-in IC chip of the noncontact type, there is a portable terminal having a built-in IC chip of the noncontact type and produces the same effect as that of the electronic money card 4 by using the IC chip.

Figure 10:
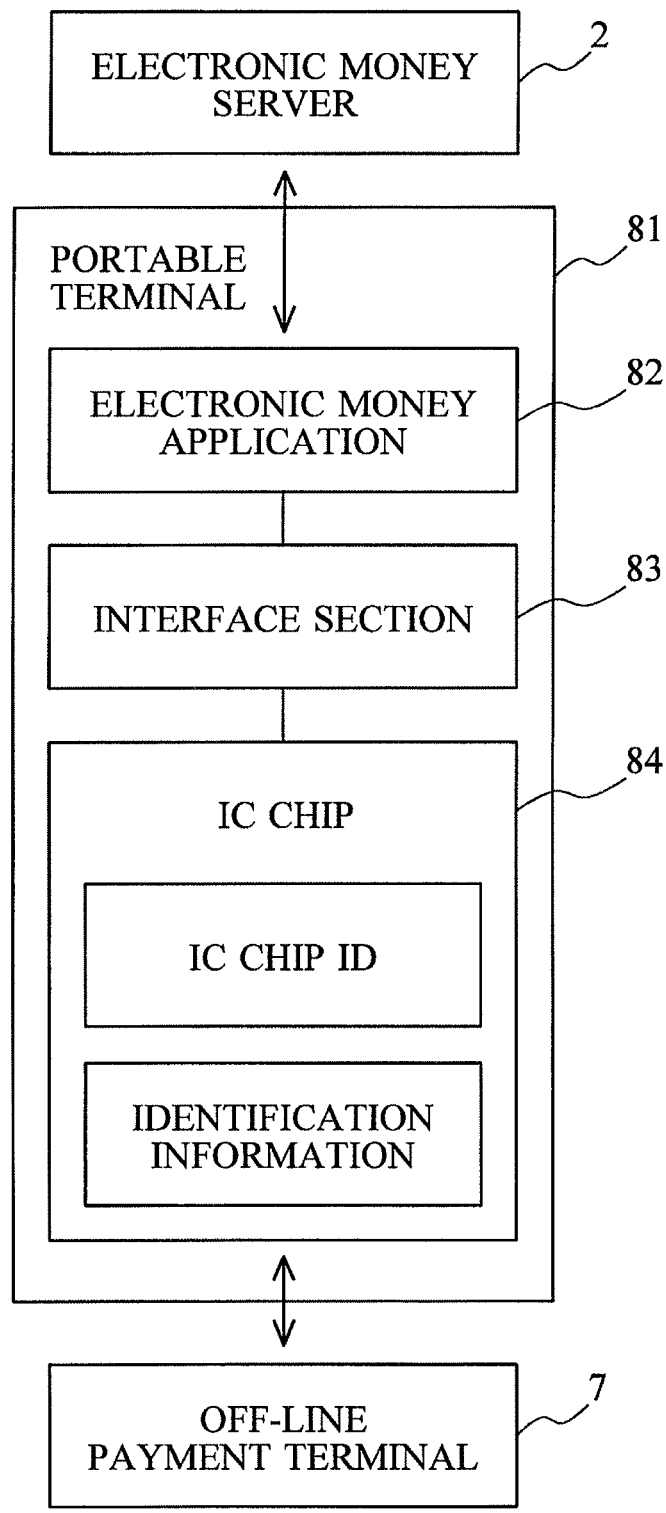
FIG. 10 is a diagram for explaining Modified Example 4 of the first embodiment.

FIG. 10 is a diagram for explaining a portable terminal into which an IC chip of the noncontact type is incorporated.

A portable terminal 81 incorporates an IC chip 84 of the noncontact type. The IC chip 84 of the noncontact type can perform communication with an electronic money application 82 via an interface section 83.

The IC chip 84 records an IC chip ID which is identification information of the IC chip 84 itself and identification information by which an electronic money account is identified.

The reader/writer 46 of the off-line payment terminal 7 can perform communication with the IC chip 84.

In the existing payment terminal 91 (FIG. 15), in response to the polling performed on the electronic money card 92, the electronic money card 92 makes a response by using the IC chip ID.

To be compatible with this, in this modified example, for example, in the portable terminal 81, the electronic money application 82 reads the IC chip ID and the identification information in step 105 of FIG. 6 and transmits the IC chip ID and the identification information to the electronic money server 2.

Then, in response to the polling performed in step 120, the electronic money server 2 transmits the IC chip ID to the off-line payment terminal 7 as a response. Alternatively, as the identification information, it is also possible to use the IC chip ID.

On the other hand, the off-line payment terminal 7 communicates with the electronic money server by using, as relays, the IC chip 84, the interface section 83, and the electronic money application 82.

The procedure of payment processing performed by the electronic money server 2, the portable terminal 81, and the off-line payment terminal 7 in cooperation with one another is the same as that of the embodiment.

(3) Outline of a Second Embodiment

Figure 11:
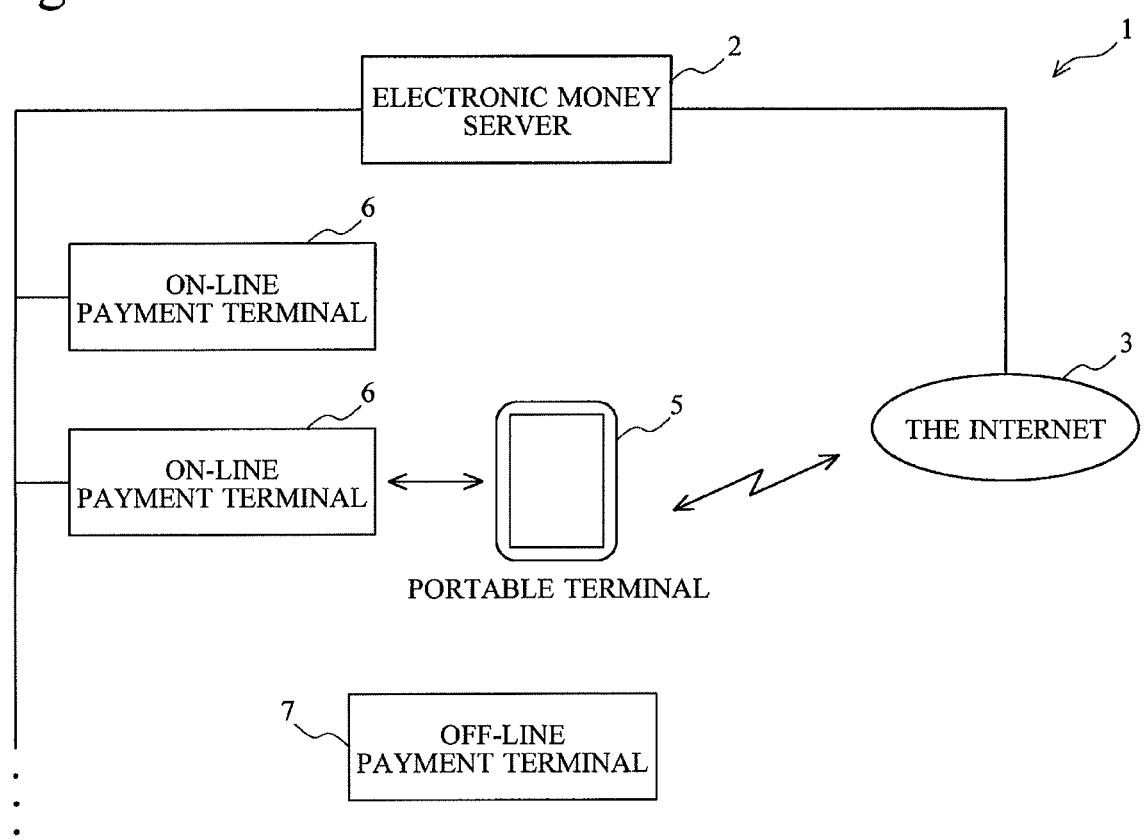
FIG. 11 is a diagram for explaining the network configuration of an electronic money system according to a second embodiment.

As depicted in FIG. 11, the portable terminal 5 connects to the on-line payment terminal 6 by short-distance radio communication and also connects to the electronic money server 2 via the Internet 3.

When it is confirmed that the electronic money server 2 connects to the on-line payment terminal 6 via the portable terminal 5 and also connects to the portable terminal 5 via the on-line payment terminal 6, the electronic money server 2 performs the payment processing in the electronic money server 2 without making a request for the balance or the like. By reducing the data transmission quantity in this manner, it is possible to reduce the time needed for payment and reduce the occurrence of troubles.

As described above, the electronic money server 2 of this embodiment can identify the on-line payment terminal 6 and the portable terminal 5 which are currently connected to each other by matching the on-line payment terminal 6 and the portable terminal 5 which are connected to the electronic money server 2 in real time.

(4) Details of the Second Embodiment

When payment processing is performed in the electronic money system 1 (FIG. 1) by connecting the portable terminal 5 to the on-line payment terminal 6, since the electronic money system 1 records the balance, there is a need to connect the electronic money server 2 and the on-line payment terminal 6 in real time.

However, when connection is established online via a communication network, it takes reasonable time to transmit data. Moreover, there is a possibility that some kind of trouble occurs during data transmission and payment processing is not completed normally.

Thus, in this embodiment, the electronic money server 2 flexibly handles them in accordance with the environment of the on-line payment terminal 6 and the portable terminal 5, whereby the processing time is reduced and the occurrence of troubles is reduced.

FIG. 11 is a diagram for explaining the network configuration of an electronic money system according to the second embodiment. The same component elements as those in the first embodiment are identified with the same characters.

The portable terminal 5 can connect to the on-line payment terminal 6 by performing short-distance communication with the reader/writer 46 of the on-line payment terminal 6. Moreover, the portable terminal 5 can also connect to the electronic money server 2 via the Internet 3.

Then, the on-line payment terminal 6 can connect to the electronic money server 2 by using the portable terminal 5 as a relay, and the portable terminal 5 can connect to the electronic money server 2 by using the on-line payment terminal 6 as a relay device.

When the electronic money server 2 connects to the portable terminal 5 via the on-line payment terminal 6 and connects to the on-line payment terminal 6 via the portable terminal 5 in this manner, the electronic money server 2 internally processes those that can be processed in the electronic money server 2 without performing communication with the portable terminal 5 or the on-line payment terminal 6 and thereby reduces the turnaround time and the occurrence of troubles.

Figure 12:
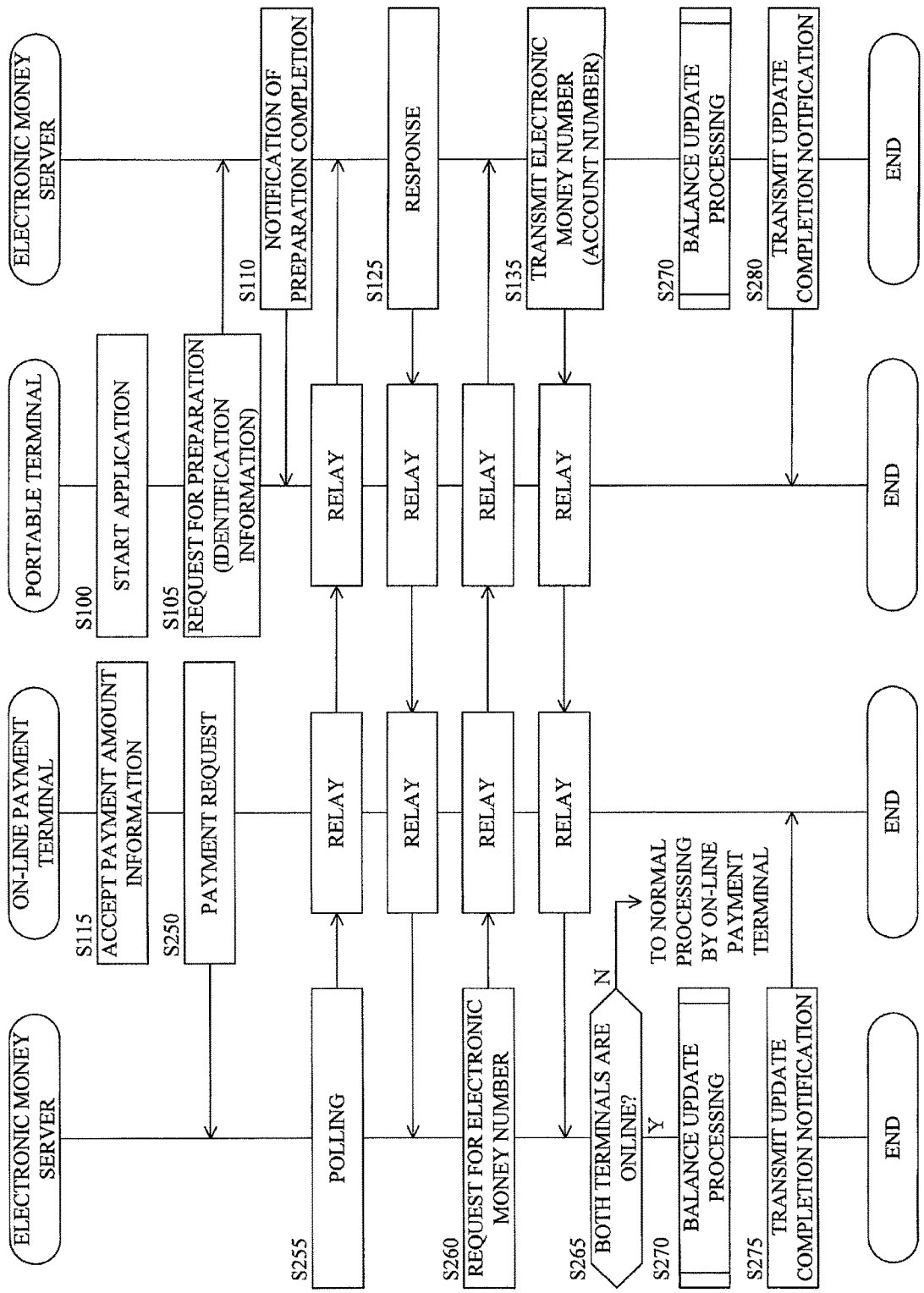
FIG. 12 is a flowchart for explaining payment processing of the second embodiment.

FIG. 12 is a flowchart for explaining payment processing of this embodiment.

Incidentally, in the flowchart, two electronic money servers 2 are depicted for facilitating illustration, but they are one and the same electronic money server 2. Incidentally, it is also possible to use two electronic money servers 2. In this case, always-on connection is made possible between the two electronic money servers 2 so that they can function as one electronic money server 2.

First, in the portable terminal 5, the electronic money application 21 is started (step 100), and the portable terminal 5 transmits identification information to the electronic money server 2 (step 105). In response to this, the electronic money server 2 transmits a preparation completion notification to the portable terminal 5 (step 110).

On the other hand, the on-line payment terminal 6 accepts payment amount information (step 115) and transmits a payment request to the electronic money server 2 (step 250).

When receiving the payment request, the electronic money server 2 performs polling on the portable terminal 5 via the on-line payment terminal 6 (step 255). The portable terminal 5 relays this polling to the electronic money server 2.

When receiving the polling from the portable terminal 5, the electronic money server 2 returns a response to the portable terminal 5 (step 125). This response is transmitted to the electronic money server 2 via the on-line payment terminal 6.

Next, the electronic money server 2 requests an electronic money number from the portable terminal 5 via the on-line payment terminal 6 (step 260), and the portable terminal 5 transfers the electronic money number to the electronic money server 2.

In response to this request, the electronic money server 2 transmits, to the portable terminal 5, the account number as the electronic money number (step 135). The account number is transferred to the electronic money server 2 via the portable terminal 5 and the on-line payment terminal 6.

Next, the electronic money server 2 determines whether or not the on-line payment terminal 6 and the portable terminal which are currently connected to each other are online with the electronic money server 2 at the same time, that is, whether or not the portable terminal 5 connects to the electronic money server 2 via the on-line payment terminal 6 and the on-line payment terminal 6 connects to the electronic money server 2 via the portable terminal 5 (step 265).

This determination is made by checking whether or not the account number which the electronic money server 2 had transmitted to the portable terminal 5 was transmitted from the on-line payment terminal 6 in a predetermined time.

It takes some time for the account number which the electronic money server 2 transmitted to the portable terminal 5 to be transmitted from the on-line payment terminal 6 due to a delay in the network. Therefore, it is necessary to set the predetermined time so as to be longer than this delay time.

On the other hand, if the predetermined time is set so as to be too long, the portable terminal 5 may be removed from the on-line payment terminal 6 during that time.

Thus, in the electronic money system 1, the predetermined time is set so as to be longer than the delay time and so as to be the shortest time.

If it is determined that both terminals are not in an online state (step 265; N), the electronic money server 2 proceeds to normal processing of the on-line payment terminal 6.

If it is determined that both terminals are in an online state (step 265; Y), the electronic money server 2 makes payment by performing balance update processing (step 270).

Then, the electronic money server 2 transmits an update completion notification to the on-line payment terminal 6 (step 275) and transmits the update completion notification also to the portable terminal 5 (step 280).

Figure 13:
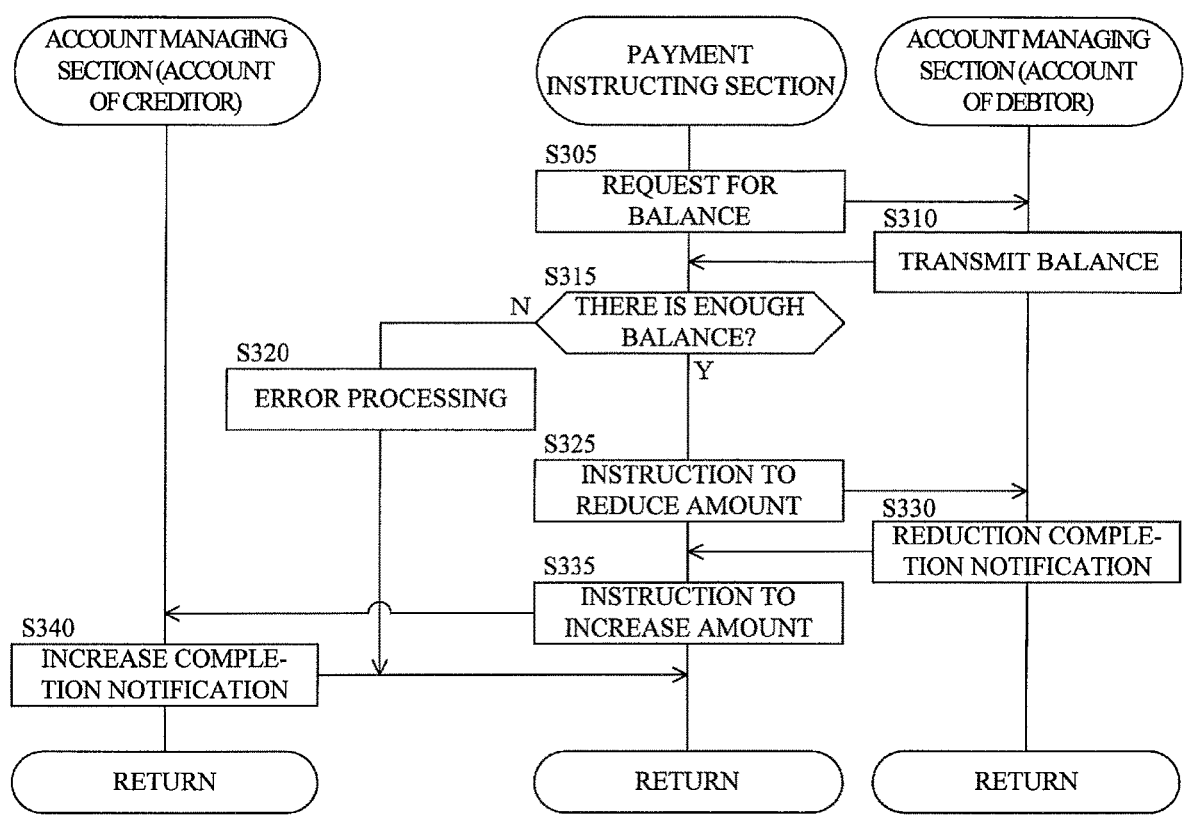
FIG. 13 is a flowchart for explaining balance update processing.

FIG. 13 is a flowchart for explaining balance update processing of (step 270).

This flowchart depicts processing that is performed by a payment instructing section and an account managing section which are formed in the electronic money server 2.

Moreover, in this embodiment, in addition to the balance of the account of the user, a member store is also registered as a user, and the balance of the account of the member store is recorded on the user DB.

Incidentally, a debtor is a transfer source of a fund (value) and a creditor is a transfer destination of the fund. In the case of payment for a product, the member store is a creditor and the user is a debtor; in the case of charging, the member store is a debtor and the user is a creditor.

First, the payment instructing section requests the balance of the account of the debtor from the account managing section (step 305).

The account managing section reads the balance of the account of the debtor from the user DB and transmits the balance to the payment instructing section (step 310).

The payment instructing section receives the balance from the account managing section and determines whether or not there is enough balance (step 315). A determination as to whether or not there is enough balance is made as follows, for example: it is determined that there is enough balance if the balance is more than or equal to the payment amount.

If it is determined that there is not enough balance (step 315; N), the payment instructing section performs error processing (step 302) and ends processing.

If it is determined that there is enough balance (step 315; Y), the payment instructing section gives an instruction to the account managing section to reduce the balance by the payment amount (step 325).

In response to this instruction, the account managing section reduces the balance of the account of the debtor only by the payment amount and transmits a reduction completion notification to the payment instructing section (step 330).

When receiving the reduction completion notification, the payment instructing section gives an instruction to the account managing section to increase the balance of the account of the creditor only by the payment amount (step 335).

In response to this instruction, the account managing section increases the balance of the account of the creditor only by the payment amount and transmits an increase completion notification to the payment instructing section (step 340).

As a result of the above processing, the money value (value) corresponding to the payment amount is transferred from the debtor to the creditor.

As described above, in this embodiment, when the electronic money server 2 determines that both terminals are in an online state, sine the electronic money server 2 performs the subsequent processing in the electronic money server 2, transmission of data is omitted and the turnaround time is reduced. Furthermore, since troubles are less likely to occur in the internal processing of the electronic money server 2, the possibility of unsuccessful payment is decreased.

Incidentally, in this embodiment, it is assumed that both the member store and the user have the balance in the accounts, but various modifications are possible. For example, the member store may adjust the accounts later by accumulating the log data without updating the balance of the account.

Moreover, the user may also adjust the accounts later by accumulating the log data without updating the balance.

According to this second embodiment, since data transmission processing is reduced, it is possible to produce the effect of speeding up the processing and reducing the occurrence of troubles.

Modified Example 1

In this modified example, at the time of response to polling, the electronic money server 2 transmits a pseudo IC chip ID to the portable terminal 5, and, when the on-line payment terminal 6 receives the pseudo IC chip ID from the portable terminal 5 and transfers it to the electronic money server 2, the electronic money server 2 determines that both terminals are in an online state and performs the subsequent payment processing in the electronic money server 2.

In this embodiment, since only polling and a response are performed as substantial data transmission performed via the communication network, the turnaround time is further reduced and the occurrence of troubles is further suppressed.

Modified Example 2

In this modified example, if it is determined that there is enough balance on the debtor side in step 315 (FIG. 13), before the balance is increased or reduced by the account managing section, a completion notification is transmitted to the portable terminal 5 and the on-line payment terminal 6.

Here, a case where there is enough balance means a money amount with which the chances of the balance becoming not large enough to pay the payment amount are adequately low.

For example, it is possible to calculate a common payment amount from an average value or the like and set an amount that is prescribed times greater than the average value as enough balance. Specifically, when the payment amount per payment is 1000 yen, if the balance is more than or equal to 30000 yen which is 30 times greater than 1000 yen, it can be determined that there is enough balance because the chances of the balance becoming not large enough to pay the payment amount are quite low.

Moreover, it is also possible to predict the amount to be paid per payment operation from the past purchase history of the user and set a sufficient balance amount for each user based on this prediction.

Alternatively, since the payment amount differs from industry of a member store to industry of a member store, such as a convenience store and a restaurant, it is also possible to set dynamically a sufficient balance for each industry of a member store when the user makes payment.

Modified Example 3

In this modified example, fund transfer is performed between two portable terminals 5.

Figure 14:
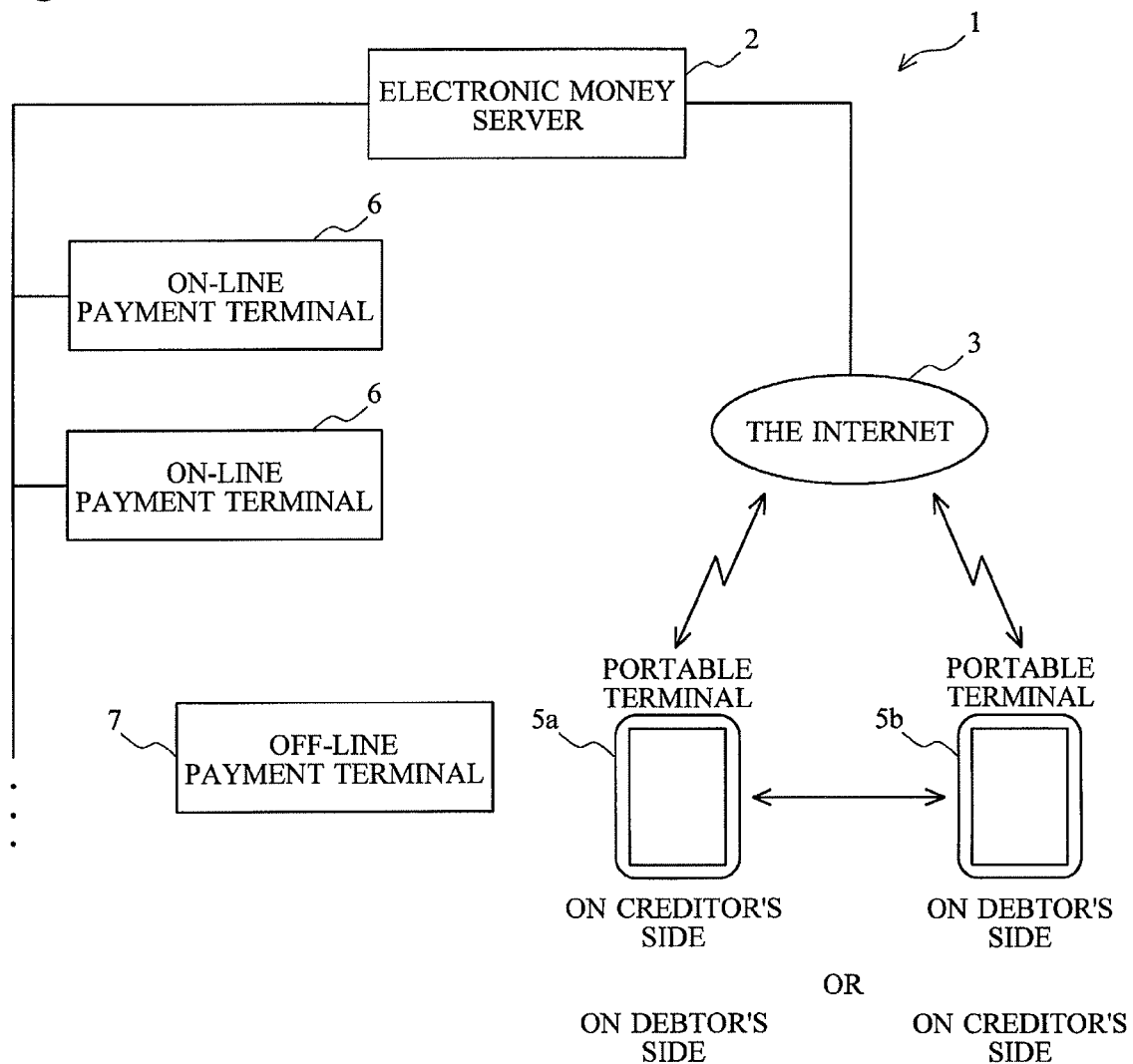
FIG. 14 is a diagram for explaining Modified Example 3 of the second embodiment.

FIG. 14 is a diagram for explaining Modified Example 3.

A portable terminal 5a and a portable terminal 5b connect to each other by using short-distance radio communication such as Bluetooth and infrared communication.

Furthermore, both the portable terminal 5a and the portable terminal 5b connect to the electronic money server 2 via the Internet 3.

In this case, by making the portable terminal 5a correspond to the on-line payment terminal 6 (FIG. 11) of the second embodiment and making the portable terminal 5b correspond to the portable terminal 5, it is possible to perform fund transfer between the portable terminal 5a and the portable terminal 5b.

More specifically, when the electronic money server 2 confirms that the electronic money server 2 connects to the portable terminal 5a via the portable terminal 5b and connects to the portable terminal 5b via the portable terminal 5a, the electronic money server 2 subsequently performs processing in the electronic money server 2 and performs fund transfer between the account of the portable terminal 5a and the account of the portable terminal 5b.

Either the portable terminal 5a or the portable terminal 5b may send the payment amount information to the electronic money server 2.

According to this modified example, it is possible to perform the transfer of a value also between the users and make use of a value more flexibly.

By the above descriptions, the following configurations can be obtained.

(1) The portable terminal 5 functions as a paying-side terminal and the off-line payment terminal 7 and the electronic money card 4 function as receiving-side terminals.

Therefore, the electronic money server 2 of the first embodiment includes a first connecting unit that connects to the paying-side terminal and a second connecting unit that connects to the receiving-side terminal via the paying-side terminal that has established connection.

The electronic money server 2 includes an account identifying unit that identifies a first account related to the paying-side terminal that has established connection and a second account related to the receiving-side terminal that has established connection in order to identify an account (an account number in the case of the portable terminal 5 and a member store ID in the case of the off-line payment terminal 7) which is information by which a transfer source and a transfer destination of fund transfer are identified.

Moreover, the electronic money server 2 includes a fund transfer information acquiring unit that acquires fund transfer information including the direction and the amount of fund transfer that is performed between the identified first account and the identified second account in order to acquire the transfer source, the transfer destination, and the amount of a fund based on payment amount information.

Furthermore, the electronic money server 2 includes a fund transfer recording unit that records fund transfer between the first account and the second account in accordance with the acquired fund transfer information in order to record the transfer source, the transfer destination, and the amount of a fund on log data.

(2) The electronic money server 2 records the balance of each electronic money account on the user DB, and, to update the balance based on the payment amount information, includes a first balance recording unit on which the balance of the first account is recorded and an updating unit that updates the first balance thus recorded in accordance with the acquired fund transfer information.

(3) In Modified Example 2 of the first embodiment, since the balance is recorded on the user DB on a value type-by-value type basis, in the first account, the balance is set for each type of money value.

Moreover, the electronic money server 2 includes a type acquiring unit that acquires the type of a value involved in payment from the off-line payment terminal 7 or the on-line payment terminal 6 and acquires the type of money value that is used in the fund transfer to update the balance of a value for each type, and the updating unit updates, of the balance of the first account, the balance of money value corresponding to the type thus acquired.

(4) In Modified Example 2 of the first embodiment, the type of a value involved in payment is acquired from the off-line payment terminal 7 or the on-line payment terminal 6, and payment is made by using a utility value. Then, the type of a value into which the utility value has been converted is recorded on log data. Therefore, the electronic money server 2 is provided with a type acquiring unit that acquires the type of money value which is used in the fund transfer, the updating unit updates the first balance irrespective of the type of money value thus acquired, and the fund transfer recording unit records fund transfer for each of the types thus acquired. (5) In Modified Example 3 of the first embodiment, since the balance of the electronic money card 4 that connects to the electronic money server 2 via the portable terminal 5 or the balance of another portable terminal 5 is recorded and payment is made by updating the balance, the electronic money server 2 is provided with a second balance recording unit on which the balance of the second account is recorded, and the updating unit updates the recorded second balance in accordance with the acquired fund transfer information.

(6) Since the portable terminal 5 of the first embodiment transmits the identification information thereof to the electronic money server 2 and makes the off-line payment terminal 7 and the electronic money server 2 perform communication by functioning as a relay device, the portable terminal 5 includes a server connecting unit that connects to a paying-side terminal, connects to a receiving-side terminal via the paying-side terminal that has established connection, and connects to a predetermined server as the paying-side terminal, the predetermined server that performs fund transfer between an account corresponding to the paying-side terminal that has established connection and an account corresponding to the receiving-side terminal, an identifying information transmitting unit that transmits, to the predetermined server that has established connection, identifying information by which the portable terminal is identified, and a relay unit that relays communication between the receiving-side terminal and the predetermined server.

(7) In Modified Example 1 of the first embodiment, since the portable terminal 5 caches an account number or the like and responds to the off-line payment terminal 7 in place of the electronic money server 2, the portable terminal 5 includes an information recording unit that acquires predetermined information from the predetermined server, the predetermined information which the receiving-side terminal requests from the predetermined server, and records the predetermined information, and a responding unit that makes a response when the receiving-side terminal requests the predetermined information from the predetermined server and transmits the recorded predetermined information in place of the predetermined server.

(8) Since the electronic money server 2 of the second embodiment can connect to the on-line payment terminal 6 via the portable terminal 5 and connect to the portable terminal 5 via the on-line payment terminal 6, the electronic money server 2 includes a first connecting unit that connects to a receiving-side terminal via a paying-side terminal and a second connecting unit that connects to the paying-side terminal via the receiving-side terminal.

In addition, the electronic money server 2 includes an account identifying unit that identifies an account related to the paying-side terminal and an account related to the receiving-side terminal, the paying-side terminal and the receiving-side terminal that have established connection by at least one of the first connecting unit and the second connecting unit, in order to identify an account number of the portable terminal 5 and a payment terminal ID of the on-line payment terminal 6.

Furthermore, the electronic money server 2 includes a fund transfer information acquiring unit that acquires fund transfer information including the direction and the amount of fund transfer that is performed between the identified paying-side account and the identified receiving-side account in order to acquire the payment amount information.

Moreover, the electronic money server 2 includes a confirming unit that confirms that the electronic money server 2 connects to the receiving-side terminal via the paying-side terminal by the first connecting unit and connects to the paying-side terminal via the receiving-side terminal by the second connecting unit in order to confirm in real time that the electronic money server 2 connects to the on-line payment terminal 6 via the portable terminal 5 and connects to the portable terminal 5 via the on-line payment terminal 6.

In addition, in order to perform the subsequent payment processing in the electronic money server 2 when the confirmation is obtained, the electronic money server 2 includes a fund transfer recording unit that records fund transfer between the first account and the second account in accordance with the acquired fund transfer information when the confirmation is obtained.

(9) The electronic money server 2 records the balance of an account corresponding to the portable terminal 5 and, to update the balance, includes a first balance recording unit on which the balance of the first account is recorded and an updating unit that updates the recorded first balance in accordance with the acquired fund transfer information.

(10) In the second embodiment, an account number of an electronic money account is used as terminal identifying information, and, in Modified Example 1, a pseudo IC chip ID is used as terminal identifying information.

Therefore, the updating unit immediately updates the first balance when the paying-side terminal identifying information acquired from the paying-side terminal and the paying-side terminal identifying information acquired from the paying-side terminal via the receiving-side terminal coincide with each other.

(11) In Modified Example 2 of the second embodiment, to provide a completion notification without waiting for the completion of payment when the portable terminal 5 has enough balance, there are provided a first balance acquiring unit that acquires the balance of the first account and an update completion notification transmitting unit that transmits an update completion notification to the paying-side terminal before the update by the updating unit is completed after the confirmation is obtained by the confirming unit when the acquired balance is more than or equal to a predetermined amount.

(12) In Modified Example 3 of the second embodiment, to perform fund transfer by using two portable terminals 5, the electronic money server 2 includes a second balance recording unit on which the balance of the second account is recorded, and the updating unit updates the recorded second balance in accordance with the acquired fund transfer information.

EXPLANATIONS OF LETTERS OR NUMERALS 1 electronic money system
2 electronic money server
3 the Internet
4 electronic money card
5 portable terminal
6 on-line payment terminal
7 off-line payment terminal
8 communication line
11 CPU
12 ROM
13 RAM
14 input section
15 output section
16 communication control section
17 short-distance radio communication control section
18 storing section
19 bus line
20 electronic money application program product
21 electronic money application
25 touch panel
26 icon
31 CPU
32 ROM
33 RAM
34 communication control section
35 storing section
36 bus line
41 CPU
42 ROM
43 RAM
44 input section
45 output section
46 reader/writer
47 storing section
48 communication control section
51 payment processing section
82 electronic money application
53 interface section
54 IC chip
91 payment terminal
92 electronic money card

The invention claimed is:

1. An information processing server comprising:
at least one memory operable to store program code; and
at least one processor operable to read the program code and operate as instructed by the program code to perform a fund transfer between a paying-side terminal and a receiving-side terminal, wherein the information processing server has a real time communication network connection with the paying-side terminal and does not have the real time communication network connection directly with the receiving-side terminal,
wherein the program code comprises:
balance change instruction receiving code configured to cause the at least one processor to:
prior to transferring a fund, connect to the receiving-side terminal via the paying-side terminal by using the paying-side terminal as a relay device, the paying-side terminal communicatively connected to the receiving-side terminal, and
receive, via a connection to the receiving-side terminal via the paying-side terminal, a balance change instruction from the receiving-side terminal via the paying-side terminal;
balance updating code configured to cause the at least one processor to transfer the fund between the paying-side terminal and the receiving-side terminal by updating in real time in response to the balance change instruction, a balance stored in a storage of the server in a state in which the balance is related to the paying-side terminal, the storage configured to store a balance of an electronic value; and
balance change response sending code configured to cause the at least one processor to send a balance change response to the acquired balance change instruction to the receiving-side terminal via the paying-side terminal.

2. The information processing server according to claim 1, wherein the program code further comprises:
identification information acquiring code configured to cause the at least one processor to acquire identification information from the paying-side terminal that reads, from a temporary storage, response information corresponding to request information when acquiring the request information from the receiving-side terminal via the paying-side terminal and send the response information to the receiving-side terminal via the paying-side terminal; and
code configured to cause the at least one processor to transmit, to the paying-side terminal, data stored in the storage in a state in which the data is related to the acquired identification information and control the temporary storage to store the data.

3. The information processing server according to claim 1, wherein
the storage is configured to store a balance of each type of an electronic value,
the program code further includes type identifying code configured to cause the at least one processor to identify a type of an electronic value based on data that is transmitted from the receiving-side terminal via the paying-side terminal, and
the balance updating code causes the at least one processor to update a balance of an electronic value corresponding to the identified type, the electronic value of electronic values stored in the storage in a state in which the electronic values are related to the paying-side terminal.

4. The information processing server according to claim 1, wherein
the storage is configured to store a balance of each type of an electronic value,
the program code further includes type identifying code configured to cause the at least one processor to identify a type of an electronic value based on data that is transmitted from the receiving-side terminal,
the balance updating code configured to cause the at least one processor to update a balance of an electronic value that does not correspond to the identified type, the electronic value of electronic values stored in the storage in a state in which the electronic values are related to the paying-side terminal, and
the program code further includes fund transfer information outputting code configured to cause the at least one processor to output fund transfer information including the identified type of an electronic value.

5. An information processing method performed by an information processing system, the information processing system comprising a paying-side terminal; a receiving-side terminal; and a server, the method comprising:

performing, by the server, a fund transfer between a paying-side terminal and a receiving-side terminal, wherein the server has a real time communication network connection with the paying-side terminal and does not have the real time communication network connection directly with the receiving-side terminal;

prior to transferring a fund, connecting by the server to the receiving-side terminal via the paying-side terminal by using the paying-side terminal as a relay device, the paying-side terminal communicatively connected to the receiving-side terminal, and receiving, via a connection to the receiving-side terminal via the paying-side terminal, a balance change instruction from the receiving-side terminal via the paying-side terminal;

transferring, by the server, the fund between the paying-side terminal and the receiving-side terminal by updating, in real time in response to the balance change instruction, a balance of an electronic value stored in a storage included in the server in a state in which the balance is related to the paying-side terminal; and sending, by the server, a balance change response to the acquired balance change instruction to the receiving-side terminal via the paying-side terminal.

\* \* \* \* \*